United States Patent [19]
East, IV et al.

[11] Patent Number: 5,975,748
[45] Date of Patent: *Nov. 2, 1999

[54] SERVO LUNG SIMULATOR AND RELATED CONTROL METHOD

[75] Inventors: Thomas D. East, IV, Salt Lake City, Utah; Jeffrey D. Anderson, Laramie, Wyo.; Ernest B. Page, Salt Lake City, Utah

[73] Assignee: IHC Health Services, Inc., Salt Lake City, Utah

[ * ] Notice: This patent issued on a continued prosecution application filed under 37 CFR 1.53(d), and is subject to the twenty year patent term provisions of 35 U.S.C. 154(a)(2).

[21] Appl. No.: 08/849,395
[22] PCT Filed: Sep. 30, 1996
[86] PCT No.: PCT/US96/15687
  § 371 Date: May 29, 1997
  § 102(e) Date: May 29, 1997
[87] PCT Pub. No.: WO97/12351
  PCT Pub. Date: Apr. 3, 1997
[51] Int. Cl.$^6$ .................................................. G09B 23/28
[52] U.S. Cl. ............................................................ 364/578
[58] Field of Search ........................ 364/578; 395/500.32

[56] References Cited

U.S. PATENT DOCUMENTS

| | | | |
|---|---|---|---|
| Re. 29,317 | 7/1977 | Mosley et al. | 35/17 |
| 3,049,812 | 8/1962 | Bovard | 35/19 |
| 3,420,225 | 1/1969 | Holden et al. | 128/2.08 |

(List continued on next page.)

OTHER PUBLICATIONS

Gardner, RM, Hankinson, JL, and West, BJ, "Evaluating Commercially Available Spirometers" *American Review of Respiratory Disease* vol. 121, pp. 73–82 (1980).

Gardner, RM, Hankison, JL, and West, BJ, "Testing Spirometers—ATS Standards" *ATS News* pp. 24–25.

Hankinson, JL, Gardner, RM, "Standard Waveforms for Spirometer Testing" *Am. Rev. Resp. Dis.* (1982), vol. 126, pp. 362–364.

Hankinson, JL and Gardner, RM, "Standardization of Spirometery" *Am. Rev. Resp. Dis.* (1982), vol. 126, pp. 493–495.

Hankinson, JL and Gardner RM, "Standardization of Spirometry—1987 ATS Update", Letters to the Editor, *Journal of Occupational Medicine.* vol. 30, No. 3 (Mar. 1988) pp. 272–273.

"Report of Snowbird Workshop on Standardization of Spirometry" *ATS News* Thornton, MJ ed., (Summer 1977) vol. 3, No. 3, pp. 20–24.

(List continued on next page.)

*Primary Examiner*—Kevin J. Teska
*Assistant Examiner*—Hugh Jones
*Attorney, Agent, or Firm*—Lloyd W. Sadler; Eleanor V. Goodall; Mark G. Sanbaken

[57] ABSTRACT

A computer-controlled servo lung simulator including a mechanical piston which simulates the mechanical properties of the human lung, chest wall and diaphragm. The computer control implemented in the invention includes methods for controlling the servo lung simulator to provide the simulation and control signals for the mechanical piston. The invented servo lung simulator includes abilities such as (a) providing a one or two compartment lung simulation of pediatric and adult patients, (b) simulation of an active chest wall that can emulate triggering events as well as spontaneous breathing, (c) measurement of volume and flow to better than 1% accuracy, (d) compliance and resistance elements can be chosen from an almost infinite spectrum of possibilities, (e) enables user to collect, display and store various data results like flow, volume, pressures, peak pressure, pause pressure, breath rate, (f) able to measure work of breathing, trigger response times and other indicators of the quality of spontaneous breathing support modes, (g) simulation of coughs, sighs, ventilatory dysynchrony, and other spontaneous diaphragm and chest wall components of respiration.

32 Claims, 5 Drawing Sheets

U.S. PATENT DOCUMENTS

| | | | |
|---|---|---|---|
| 3,589,190 | 6/1971 | Jones | 73/279 |
| 3,808,706 | 5/1974 | Mosley et al. | 35/17 |
| 4,001,700 | 1/1977 | Cook et al. | 328/129 |
| 4,036,221 | 7/1977 | Hillsman et al. | 128/204.23 |
| 4,167,070 | 9/1979 | Orden | 35/17 |
| 4,324,127 | 4/1982 | Gazzara et al. | 73/3 |
| 4,407,152 | 10/1983 | Guth | 73/1 G |
| 4,430,893 | 2/1984 | Barkalow | 73/168 |
| 4,878,388 | 11/1989 | Loughlin et al. | 73/866.4 |
| 4,996,980 | 3/1991 | Frankenberger et al. | 128/200.24 |
| 5,076,093 | 12/1991 | Jones, Jr. et al. | 73/3 |
| 5,277,176 | 1/1994 | Habashi et al. | 128/200.24 |
| 5,277,196 | 1/1994 | Hankinson et al. | 128/725 |
| 5,327,774 | 7/1994 | Nguyen et al. | 73/37 |
| 5,403,192 | 4/1995 | Kleinwaks et al. | 434/272 |
| 5,473,954 | 12/1995 | Hoyt et al. | 73/865.6 |
| 5,584,701 | 12/1996 | Lampotang et al. | 434/272 |

OTHER PUBLICATIONS

Renzetti, Jr., AD, "Standardization of Spirometry—Statement American Thoracic Society", American Lung Association vol. 119 No. 5 (May 1979) pp. 1–11.

Yeh, MP, Gardner, RM, Adams, TD and Yanowitz, FG, "Computerized Determination of Pneumotachometer Characteristics Using a Calibrated Syringe", Special Communications, The American Physiological Society (1982) pp. 280–285.

Crapo, RO, Morris, AH and Garnder, RM, "Reference Spirometric Values Using Techniques and Equipment that Meet ATS Recommendations", *Am. Rev. Resp. Dis.* (1981) vol. 123, pp. 659–664.

Gardner, RM, Glindmeyer III, HW, Hankinson, JL, "Standardization of Spirometry with Special Emphais in Field Testing" *Occupational Lung Diseases Research Approaches and Methods*, Marcel Decker, Inc. NY (1981) pp. 61–85.

Ostler, DV, Gardner, RM and Crapo, RO, "A Computer System for Analysis and Transmission of Spirometry Waveforms Using Volume Sampling", *Computers and Biomedical Research*, (1984) 17 pp. 229–240.

Crapo, RO, Morris, AH and Gardner, RM, *Am. Rev. Resp. Dis.* (Sep. 9, 1981) 124:764.

Sweeney, JT (May 19, 1980), Glindmeyer, H (Feb. 14, 1980) and Putterman, K (Mar. 5 1980), Gardner, RM, Hankinson, JI, and West, BJ (Mar. 31, 1980) "Evaluating Commercially Available Spirometers" *Am. J. Resp. Dis.*, (1980) pp. 171–175.

Gardner, RM, "How to Evaluate Commercially Available Spirometers", Lecture Series 1981 American Association for Respiratory Therapy, pp. 145–154.

Weiss et al., "American Thoracic Society—Device Standards—Apr. 1975" *ATS News*, 21–25.

Gardner, RM and Clemmer, TP, "Selection and Standardization of Respiratory Monitoring Equipment", *Respiratory Care* (Jul. 1985) vol. 30 No. 7, pp. 560–571.

Branson, RD, Hess, DR and Chatburn, RL, "Humidification: Humidifiers and Nebulizers" *Respiratory Care Equipment*, J.B. Lippincott Co., (1995) pp 87–101, 331–333, 425–449.

Glindmeyer III, HW, "An Experimental Investigation of the Errors of Spirometry" Thesis, Tulane University, (Nov. 1976) pp. 1–84.

West, BJ, "Dynamic Response Testing of Spirometers" Thesis, Univ. of Utah (Aug. 1977) pp. 1–37.

Nelson, SB, "Commercially Available Spirometers: A Performance Evaluation" Thesis, Univ. of Utah (Mar. 1987) pp. 1–46.

SERVO LUNG SIMULATOR AND RELATED CONTROL METHOD

Priority is hereby claimed to PCT patent application No. PCT/US96/15687, filed Sep. 30, 1996, which claims priority to U.S. patent application Ser. No. 08/536,399.

I. BACKGROUND OF INVENTION

A. Technical Field

This invention relates to the field of mechanical devices, including computer-controlled mechanical devices, which simulate the action of human breathing. One use of such devices is to test the operation of mechanical ventilators. In the preferred embodiment, the invention is a servo-controlled mechanical piston which simulates the mechanical properties of the human lung, chest wall and diaphragm. The invention includes the control method for the servo lung simulator which is implemented on a digital computer through software which provides the simulation and control signals for the mechanical piston.

B. Background Art

In the prior art, there were published standards for the minimum performance of mechanical ventilators. These published standards include ANSI Standard Z79.7, ISO Standard 5469.:1987, and ASTM Standard 1100. Testing of ventilators to determine whether these standards are met may be part of new prototype product evaluation, quality assurance during the manufacturing process, calibration in the field or as part of a routine service program. Ideally, any testing device for medical devices should meet or exceed the minimum performance standards. However, there are a few existing test lungs that exceed these published standards. The TTL, training and test lung manufactured by Michigan Instruments (Grand Rapids, Mich.) is probably one of the best known. This device uses two spring loaded bellows to create a two compartment mechanical lung simulation. A few discrete resistances can be modeled using fixed resistive elements that are added in the tubing of the test lung. Compliance is adjusted by changing the spring loaded force on the upper plate of the bellows. Lung pressure is measured using traditional pressure gauges on the front panel. Lung volume is measured by observing the displacement of the upper bellows plate. Michigan instruments sells a PC board and software that will collect data from the pressure transducers and using the compliance setting, which must be keyed in by the user, calculate volumes. This system is specified to have an accuracy of 5%. The system does provide a crude mechanism for providing triggering events; however, the ability to simulate a two compartment lung is lost if triggering is used. The lung simulator does not provide a reasonable method for simulating spontaneous respiration. There are other systems such as the Biotek system that include a pneumotach and are somewhat more sophisticated; however, in general they all have similar problems. Essentially there are not tools that can be used to reliably test mechanical ventilators throughout the spectrum of their capabilities.

II. DISCLOSURE OF THE INVENTION

The invented servo lung simulator uses a computer controlled piston to accurately reproduce the behavior of a one or two compartment lung model, including the chest wall activity necessary for modeling spontaneous breathing and triggering events. This system uses a model reference servo control algorithm to simulate the lung. "Lung" volume is calculated from piston diameter and piston position, which is measured by a shaft encoder on the motor that drives the piston. Volume can be measured to a resolution of 50 $\mu$L. This provides volume accuracy of better than 1% from pediatric to adult lung sizes. Since the model is mathematical and implemented in software, an infinite variety of resistance and compliance values can be chosen by the user. A variety of different active chest wall functions can be used that simulate simple triggering events and more complex spontaneous breathing. The system also provides integrated data acquisition, management and display.

The following is a brief list of the advantages of the invention over the prior art:

1) In prior art devices, different sets of bellows must be used for pediatric and adult simulations. The invented servo lung simulator will provide a two compartment lung simulation of pediatric and adult patients, without the need for equipment changes.

2) Prior art lung simulators do not provide a good simulation of triggering or spontaneous respiration, because the two compartment system of the prior art is entirely passive. Although it is possible to mechanically link the two bellows and drive one of the bellows with another device in order to simulate spontaneous respiration, one is left with only a one compartment spontaneous model. The practical result is a system that is very difficult to use to test trigger sensitivity and spontaneous modes of mechanical ventilation. The invented servo lung simulator provides a simulation of an active chest wall that can emulate triggering events as well as spontaneous breathing. The invented servo lung simulator can simulate coughs, sighs, ventilatory dysynchrony, and other spontaneous diaphragm and chest wall components of respiration.

3) In the prior art, accuracy is dependent on accurate knowledge of compliance. If this is not accurate large errors can occur. Moreover, flow can be derived from the derivative of volume, but no performance data are available on accuracy of flow measurements with this device. The invented servo lung simulator can measure volume and flow to better than 1% accuracy. This is at least 5 times better than existing systems.

4) Compliance and resistance elements can be chosen from an almost infinite spectrum of possibilities as compared to only a select few on existing systems in the invented servo lung simulator.

5) The invented servo lung simulator enables user to collect, display and store various data results such as flow, volume, pressures, peak pressure, pause pressure, breath rate. In addition, it provides the unique ability to measure work of breathing, trigger response times and other indicators of the quality of spontaneous breathing support modes.

These and other objects, features and advantages of the invention will become apparent to persons of ordinary skill in the art upon reading the specification in light of the appended drawings.

III. BRIEF DESCRIPTION OF THE DRAWINGS

IV. BEST MODE FOR CARRYING OUT THE INVENTION

Figure 1:
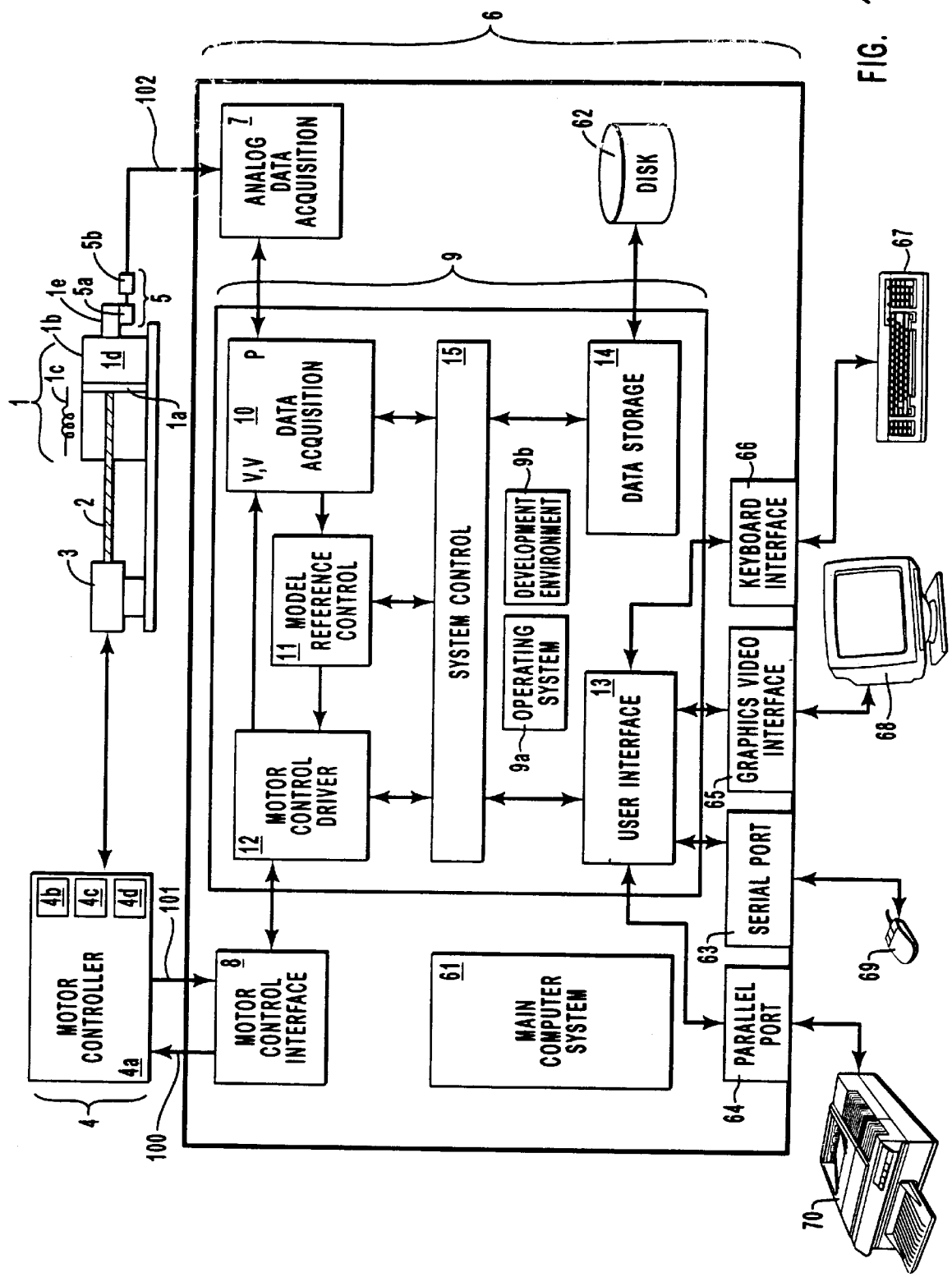
FIG. 1 depicts a functional block diagram of the invented servo lung simulator.

Attached below is a listing of computer source code (written in the TURBO PASCAL implementation of the Pascal programming language for a personal computer) that represents an implementation of one preferred embodiment of the invention.

The following abbreviations are used in the description of the invention:

| Abbreviation | Definition |
| --- | --- |
| AC | Alternating Current |
| ADC | Analog to Digital Converter |
| C | Compliance |
| CPAP | Continuous Positive Airway Pressure Ventilation |
| CPPV | Controlled Positive Pressure Ventilation |
| DAQ | Data Acquisition |
| DC | Direct Current |
| DIP | Dual In-Line Package |
| $F_IO_2$ | inspired oxygen fraction |
| FIFO | First in first out |
| I:E | inspiratory:expiratory ratio |
| ID | inner diameter |
| IR | Infrared |
| IO or I/O | Input and output |
| l | liter |
| PCIRV | Pressure Control Inverse Ratio Ventilation |
| PEEP | Positive End Expiratory Pressure (cm H2O) |
| PID | Proportional-Integral and Derivative controller |
| Ppeak | peak inspiratory pressure (cm H2O) |
| Pplat | end-inspiratory plateau pressure (cm H2O) |
| PWM | pulse width modulated |
| R | Resistance |
| RAM | Random Access Memory |
| s | seconds |
| setPEEP | PEEP value set on the ventilator (cm H2O) |
| TFE | Tetra-flouro-ethylene (Teflon) |
| VI | Virtual instrument |
| $\dot{V}_E$ | expiratory minute ventilation (l/min) |
| VR | ventilatory rate (breaths/min) |
| $V_T$ | tidal volume (ml) |

The invented servo lung simulator is a servo controlled mechanical piston which simulates the mechanical properties of the human lung, chest wall and diaphragm. The simulator provides both a one compartment and two compartment mechanical simulation with the ability to have chest wall and diaphragm activity modeled as triggering and spontaneous inspiration. Volume is measured with an accuracy of at least 1%. An infinite variety of different resistance and compliance values may be chosen via the software interface to the mathematical model. The main purpose of the simulator is to test mechanical ventilators. It could also be used in pulmonary research, class room instruction, product development, product verification and validation and assembly line Q/A.

To accomplish these goals we constructed a computer controlled high speed motor which moves a piston as necessary for the overall system to behave as if it were a two compartment lung with an active chest wall. The system performance is dependent on the motor, linkage and piston system being able to respond quickly enough to track the desired model behavior. The user is able to interact with the computer to define all values of resistance and compliance over a wide range of potential values. Pressure is measured using a solid state transducer. Volume and flow are measured by a precision shaft encoder on the motor which gives a resolution of 100 µL/step. The piston is heated to accommodate the use of heated and humidified gas. Volume, flow and pressure data are collected by the computer at 400 Hz and a mathematical model determines how to move the piston using a model reference adaptive controller. The mathematical model includes pressure or flow triggering as well as user specified spontaneous breathing patterns.

Data are displayed in real-time graphics and stored for analysis. The user is able to start and stop simulations, observe results, save results and print results. The preferred embodiment of the servo lung simulator has an accuracy, precision and bias of less than or equal to 1% throughout the functional range of the device. The function of the servo lung simulator system is constrained as follows:

| | |
| --- | --- |
| tidal volume | 10–4000 ml |
| flow rate | 0–180 l/min |
| respiratory rate | 0–150 breaths/min. |
| airway pressure | −50–150 cm $H_2O$ |
| compliance | 1–500 ml/cm $H_2O$ |
| resistance | 5–1000 cm $H_2O$/l/s |

FIG. 1 is a diagram of the functional blocks of one presently preferred embodiment of the servo lung simulator. Each of the components will now be described in greater detail.

PISTON SYSTEM

In FIG. 1, piston system 1 includes a mechanical piston 1a, cylinder 1b and a heater system 1c that can maintain the piston at body temperature. The piston and cylinder form an inner gaseous chamber 1d which functions as the "lung compartment." The "lung compartment" must be air tight and should accommodate the largest anticipated tidal volumes associated with mechanical ventilators (i.e., 4000 ml). Piston 1a preferably should have low mass to reduce inertia, and should have minimal amount of friction along cylinder 1b. Piston 1a should have a means for easily removing any condensed water vapor. The piston should have an airway connection 1e that is a standard female endotracheal tube connector (1.5 cm ID).

Piston 1a is should be manufactured to specifications with a tolerance of 16 microinch RMS, or better. In the presently preferred embodiment of the invention, piston 1a and Cylinder 1b are hard-anodized aluminum. Piston 1a must be supported in the center of the inner diameter using a low-friction, self-lubricating material. In the preferred embodiment of the invention, a Teflon piston support strip is used. The piston U-cup is made of carboxylated nitrile. The piston must maintain a seal that can be pressurized to 150 cm $H_2O$ and, when capped, maintain this pressure with less than a drop of 1 cm $H_2O$ per 30 minutes. The cylinder should have a smaller diameter than length. The diameter should be no greater than 30 cm. The smaller the diameter, the greater the linear travel distance and the smaller the potential volume resolution. Piston 1 should operate in a normal room temperature environment (10–35° C., 5% to 95% noncondensing humidity and altitude less than 3048 m). The inner piston chamber should be compatible with body temperatures (20–40° C. and up to 100% humidity). The inner piston chamber should not rust or corrode under these conditions.

Piston heater 1c is preferably a commercially available heater that can maintain the internal temperature of piston 1a and cylinder 1b at a desired temperature in the range of 20 to 40° C. The entire cylinder volume should be kept at the same temperature. The heater should preferably be compatible with 100, 120, 220 and 240 V AC±10%, 50–60 Hz power. The heater should have automatic regulation of the desired temperature and a self-shutdown in the event that a failure condition occurs. A temperature probe should be located somewhere on the inside of cylinder 1b so that it is always in contact with the gas from the mechanical ventilator. The piston heater 1c should preferably be able to maintain the cylinder internal temperature within 1° C. of the desired value.

In the embodiment presented here, mechanical linkage 2 converts motor rotation to linear displacement. It is preferred that the mechanical linkage be made of low mass rigid material that can be manufactured to specifications with a tolerance of 16 microinch RMS, or better. As much of the linkage as possible should be self-lubricating and provide a minimum level of friction to movement. Linkage 2 preferably includes a 303 stainless steel screw, with custom TFE extended life coating, with a lead accuracy of 0.0006 in./in., a self-lubricating polyacetal nut which utilizes a high stiffness bronze and steel take-up mechanism, and hardened steel shafts and self-lubricating linear bearings. The proper ratio of motor turns to linear displacement should be chosen to provide a balance between linear velocity and acceleration and displacement resolution. The linkage must be mechanically precise and throughout the lifetime of the product not wear to the point where there is excessive mechanical "slop". The linkage must be low in rotational inertia and not produce a large amount of frictional force. The mechanical linkage must be long enough to accommodate the full range of travel of the piston, and must be either adjustable or large enough to accommodate all potential piston diameters needed for adult and pediatric simulation as well as smaller pistons that might be used for a neonatal simulation. The invention is not limited by the mechanism used to produce movement of the piston; for example, the mechanical linkage can be configured differently than described herein, or the piston could be moved pneumatically.

MOTOR SYSTEM

In the preferred embodiment shown here, motor 3 is a commercially available electric motor which preferably operates on 100, 120, 220 and 240 V AC±10%, 50–60 Hz power. An example of a suitable motor is Brush-type DC Servo motor with 1,000-line optical rotary encoder (operated in quadrature mode, giving 4,000 counts per revolution) and PWM Servo Amp. The motor must be able to supply enough torque and velocity to accurately drive the piston and produce the desired "lung" response. The motor must be able to rapidly change direction and accelerate quickly to the desired speed. The motor should have an integrated position encoder that will accurately record the position of the motor. The smallest increment in the motor position encoder times the volume conversion factors of linkage 2, piston 1a and cylinder 1b (with dimensions of volume/encoder unit) should be less than 1% of 10 ml=0.1 ml or 100 $\mu$L. The motor should be able to move with a velocity necessary to create a flow of 180 l/m. This is translated into a maximum RPM by dividing 180 l/m by the volume conversion factors of linkage 2, piston 1a and cylinder 1b (with dimensions of volume/encoder unit) and then dividing this number by the number of position encoder increments/revolution. The motor should be able to accelerate at a rate necessary to create 3 l/s/0.005 s=600 l/s$^2$ which is the maximum rate of change of flow. This is translated into a maximum revolutions/sec$^2$ by dividing 600 l/s$^2$ by the volume conversion factors of the linkage 2, piston and cylinder 1 (with dimensions of volume/encoder unit) and then dividing this number by the number of position encoder increments/revolution.

The motor control system is contained in package 4, shown in FIG. 1. Package 4 contains motor controller 4a and other electronics, as described below. Motor controller 4a provides the necessary voltage and current to drive the motor. It is preferred that the controller be capable of using most commonly available AC power systems throughout the world (100, 120, 220 and 240 V AC±10%, 50–60 Hz power). For example, in one preferred embodiment of the invention, a Series 30A-AC Pulse Width Modulated Servo amplifier from Advance Motion Control is used to drive the motor. 30A-AC series PWM amplifiers are designed to drive brush type DC motors at a high switching frequency. The amplifier is interfaced to digital controller mounted on GALIL 1010 series or comparable motor driver board. The motor controller must be supported by a commercially available computer motor interface card 8.

The motor controller system 4 should also include position sensing circuitry 4b to accurately monitor the actual position of the motor without adding a significant load on the motor. For accurate position control it is preferable to use an incremental optical encoder, although alternatively, it would also be possible to use another type of position sensing device, e.g., magnetic, contact, resistive and optical encoder. An incremental encoder generates a pulse for a given increment/decrement of shaft rotation. Total rotation is determined by counting encoder output pulses. From shaft rotation, the linear movement of the shaft (distance travelled and velocity) can be calculated. From this, the position and velocity of piston 1a are easily calculated, and then the volume and air flow of chamber 1d are calculated by multiplying the length and cross-sectional area of chamber 1d.

The motor controller system 4 must also include range of motion sensing circuitry 4c which senses as the piston approaches the maximum and minimum position. The switches should require no force to operate (preferably an optical switch). The signal from these switches is provided to the software, which produces an instruction to shut down the system if the piston is at the end of the range of motion. In the preferred embodiment of the system, as a backup to the software out of range detection, the motor controller system also includes "kill" switch sensing circuitry 4d that immediately shuts down the motor in the event of failure or inappropriate use. The "kill" switches are placed at the extremes of motion of the piston and shut down the system in the event that the software shutdown fails to occur. The switch system should operate on power available in the motor controller. The switch system should be a low voltage and current system.

It is preferred that motor controller system 4 should have a motor functional status indicator which clearly shows if any of the position or "kill" switches have been activated, and shows the current functional status of motor 3 and the motor controller interface 8. It is preferred that motor controller system 4 should be small enough to easily mount next to motor 3.

PRESSURE SENSING

Pressure transducer system 5 must provide an output voltage proportional to the pressure inside the "lung compartment." The pressure transducer system consists of a pressure transducer 5a and the pressure transducer signal conditioning 5b. Pressure transducer 5a must have a linear range of −50 to 150 cm $H_2O$. The zero calibration should not drift by more than 1 cm $H_2O$ per 8 hours. The frequency response time of the pressure transducer should be adequate for the respiratory frequencies encountered in mechanical ventilation. The pressure transducer should be in a package less than 2 cm in diameter. The pressure transducer should preferably mount on the cylinder and have an air connection into the inner volume of the cylinder. In the preferred embodiment of the invention, a Validyne pressure transducer is used.

Pressure Transducer Signal Conditioning 5b should include integral amplification, linearization and filtering. It is preferred that the output signal be a voltage that is a linear function of pressure, with zero offset and scaled to use the full input range of analog data acquisition system 7. The pressure signal should be filtered to remove AC power components and frequencies above the Nyquist frequency established by the sample rate of the analog data acquisition system 7, e.g. 200 Hz at the presently preferred sampling frequency of 400 Hz. The filter should not produce a non-linear frequency dependent phase shift. Two zero adjustment and two gain adjustments should be provided. The pressure transducer signal conditioning should have good common mode rejection with a total noise level of less than 0.1% of full scale output. The amplifiers should drive less than 0.% of full scale over an 8-hour period. The low pass filter should be at least a second order filter. The pressure transducer signal conditioning is preferably an integrated package with the pressure transducer. It is preferred that the whole pressure transducer package should mount on the cylinder with a solid physical connection.

Piston system 1, mechanical linkage 2, and motor 3 are mounted on mounting base 16. Mounting base 16 should have sufficient mass to not move or rotate more than 2 mm in response to the mechanical forces generated by the Servo Lung Simulator, and it should have feet or some other shock absorbing structure that prevents translation of the mechanical forces to the surface that the Servo Lung Simulator mounting base is sitting on. The mounting base should be made of a high mass material, such as hard-anodized aluminum.

In general, piston system 1 and motor system 4 provide a means for generating positive and negative air pressures in an air chamber (chamber 1d in the present example). The pressure in the chamber is finely controlled by the servo control mechanism which drives piston 1a. The practice of the invention is not limited to these particular mechanical devices, and other mechanical devices are capable of providing finely controlled variations in pressure which replicate the behavior of a lung, may also be used. Whatever alternate embodiment is used, the pressure, volume and air flow, or parameters from which these can be calculated, must be measured.

COMPUTER SYSTEM

A commercially available computer 6 is required which is compatible with the required device interfaces, provides a reasonable user interface and is capable of running the required software and storing the testing data. Computer system 6 should preferably adapt to AC power available in different parts of the world. The computer system should have an adequate amount RAM to run the required software. The is computer should have a compatible interface (or internal bus) that will accommodate all of the other computer hardware and interface hardware. There should be internal power connections available for all internal devices such as disk drives keyboard and mouse. It is preferred that the computer operate on 100, 120, 220 and 240 V AC±10%, 50–60 Hz power. The power supply should be adequate to support all of the computer hardware and the interface hardware. The computer system should support industry standard expansion cards and accessories. The computer should have a clock speed greater than 30 MHz, and preferably greater than 100 MHz. The computer should have a math coprocessor chip. A Pentium based PC type computer is used in the preferred embodiment of the invention.

Computer system 6 should preferably have at least on disk drive 62, and preferably has a removable floppy disk drive as well as an internal hard disk. Disk drive(s) 62 and all accompanying electronics should preferably run on internal DC power available from the computer main system unit. The floppy disk drive should be a 3.5", high density disk drive. The hard disk should preferably be at least 288 Mbytes.

The computer system must have a serial port 63 for the use of a mouse 69 or similar type of pointing device. The serial port should support a full spectrum of baud rates, parity checking, hardware and software handshaking. The serial power should interface to the computer main system unit and the output should have an industry standard 25 pin D connector (or adaptor). The serial port and all of its accompanying is electrics should run on internal DC power available from the computer main system unit. The serial port should support the RS-232 standard for serial devices. The serial port should support baud rates from 1200–19,200 bit/s, parity checking capability and the selection of the desired numbered of data and stop bits.

Computer system 6 must have a parallel port 64 for sending information to a printer 70. The parallel port should use an industry standard connector and support hardware handshaking.

The parallel port should interface to the computer main system unit and the output should preferred have an industry standard Centronix connector (or adaptor). The parallel port and all its accompanying electronics should run on internal DC power available from the computer main system unit. The parallel port should support standard parallel port definitions and handshaking.

Computer system 6 must have a color graphics video interface 65 for driving an industry standard color monitor 68. The graphics must have high enough resolution to draw graphics of test results and to create the virtual instrument panels needed for the user interface. The graphics video interface must be compatible with the required software. The graphics video interface and all its accompanying electronics should run on internal DC power available from the computer main system unit. The graphics video interface should provide VGA graphics or the equivalent.

Computer 6 must have a keyboard interface 66 which allows for the connection of an industry standard keyboard 67. The keyboard should be a standard QWERTY keyboard with at least 10 special function keys, an escape key, arrow keys and a ten key pad.

The computer system must include a color monitor 68 that is compatible with the require video graphics interface 65. The color monitor should be large enough to easily read the display and have high enough resolution to accurately display the required graphics. The monitor should operate on 100, 120, 220 and 240 V AC±10%, 50–60 Hz power.

The computer system should include a mouse 69 that is compatible with the serial port 63. It is preferable that the mouse function without the need for a special mouse mat and be mechanically robust, capable of surviving occasional falls to the floor. The mouse should have at least one button and should interface to the serial port.

The analog data acquisition system 7 should convert analog voltages to digital values. The system should be capable of interfacing several different analog signals, and should be able to convert analog to digital values at a rate more than twice as high as the highest frequency component of any one of the input signals. (In the presently preferred embodiment of the invention, the highest frequency component of the signal is about 50 Hz; according to the Nyquist criteria, a sampling frequency of at least 100 Hz must be used; in practice, the inventors have found that a sampling rate of 200 Hz must be used to obtain a good digitized signal, and that preferably a rate of 400 Hz should be used. A higher sampling rate, up to 2,000 Hz would provide some small improvement over 400 Hz. The input voltage range for the system should be selectable. The input channels need to be differential inputs. It is preferred that the analog data acquisition should provide: 12-bit resolution, less than 50 $\mu$sec conversion time, 8 differential input channels, aggregate sample rates up to 10 Khz, programmable gains, multiple-channel scanning with gain switching, internal or external A/D timing and triggering, one 16-bit counter/timer. A suitable data acquisition board for use in the preferred embodiment of the invention is the National Instruments AT-MIO-16M-9.

A commercially available motor controller interface 8 should be used. In the presently preferred embodiment of the invention described herein, a Galil 1010 Motor Controller Card is used. This controller is a fully programmable servo motion controllers contained on a PC compatible card. The motor controller interface converts the desired position and velocity signals at any point in time (from the computer) to the appropriate motor control signals 100 for the motor controller to properly operate the motor. The motor controller interface should be compatible with the required motor controller 4 and motor 3. This control algorithm must take into account the acceleration and deceleration characteristics of the motor as well as its electrical and mechanical response time. The motor controller interface must also receive information from the motor controller about the actual position of the piston as well as sensing information regarding the "kill" switches and range of motion switches, on input 101. The motor controller interface must send this received information as well as motor and motor controller status information on to the computer. The I/O from the motor controller interface should be interfaced via a standard connector. The motor controller interface and all its accompanying electronics should run on internal DC power available from the computer main system unit.

SOFTWARE

An industry standard commercially available software system 9 should be used that is compatible with the required computer system 6. Software system 9 should consist of an operating system 9a and a development environment 9b that is capable of supporting the required software functions. The software system should preferably be compatible with multiple hardware platforms in order to accommodate future new computer hardware technology upgrades.

A commercially available, industry standard, operating system, e.g. DOS, as used in the presently preferred embodiment of the invention, or Windows, should be used to provide the necessary communication platform or interface between the computer hardware and software. The operating system must be capable of interpreting and processing commands for each of the devices in the computer. The operating system should include a memory management system capable of addressing the amount of RAM required by the software functions. The operating system should handle interrupts, bus management, I/O, timing, device drivers and all other functions required by the computer hardware, the analog data acquisition system, the motor controller interface 8 and the software. The operating system must be compatible with all of the required software functions. The operating system must be compatible with all of the required software functions. The operating system should provide, at least, a text based command editor that has the capability of editing the current line as well as retrieving previous lines. The operating system must be compatible with the computer main system unit, the development environment, the motor controller driver software and all of the other software modules.

Development environment 9b should be commercially available and an industry standard. The development environment should be capable of rapid development and prototyping of all required software functions. The development environment should be easy to use, provide an integral editor, compile rapidly and produce efficient executable code. The development environment should handle interrupts, bus management, I/O, timing, device drivers and all other functions required by the computer hardware the analog data acquisition system, the motor controller interface 8 and the software. The development environment must be compatible with the operating system. The development environment should provide, at least, a text based editor that has the capability of editing the development software. Ideally the development environment would be a meld of a software editor, compiler, debugger and run-time interpreter. The development environment used in the presently preferred embodiment of the invention is LabView.

Data acquisition software 10 should collect all necessary data from both the motor controller interface 8 and the analog data acquisition system 7. The data acquisition software for the analog data acquisition should handle timing, initiation of analog to digital conversion, monitoring of conversion and transfer of digital values into local program variables when conversion is complete. The data acquisition software for the motor controller interface should gather all digital data regarding motor and motor controller status, piston position and velocity and sensor switch information. This digital data should be transferred to local program variables. Conversions should be made on all input data to put it into appropriate units for pressure, volume and flow. Where ever possible, the data acquisition software should use commercially available data acquisition software routines, that are compatible with the operating system 9a and the development environment 9b. The data acquisition software must be compatible with the computer main system unit the operating system 9a the development environment 9b and all of the other software modules.

LUNG MODELS

The basic principal upon which this invention is based is that the movement of a mechanical system (in the presently preferred embodiment, piston system 1) is controlled so that it behaves as a lung model. The model reference controller 11 implements one of several possible lung models to control piston system 1 (or some alternate system, or "plant") in such a way as to make the overall system appear to behave in the same manner as the chosen model.

Figure 2:
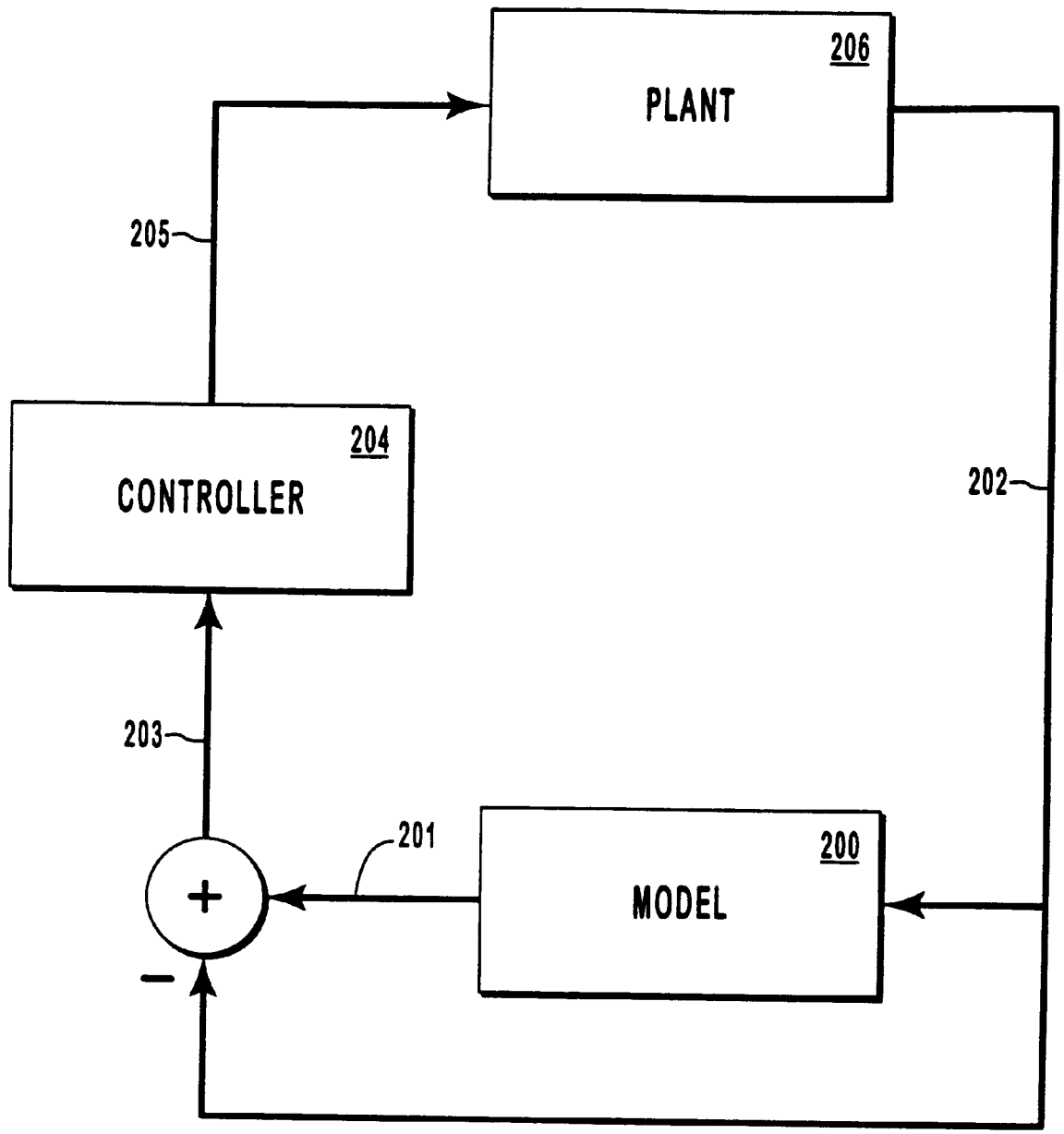
FIG. 2 depicts a generic model reference controller.

FIG. 2 is an illustration of a generic model reference controller. Control signals 205 are sent from controller 204 to plant 206. Signal 202 representing the current state of plant 206 is sent to model 200. The difference between signal 201, representing the desired state of plant 206 (signal 201 representing the desired state of plant 206, and signal 202 is determined, and the difference signal 203 is sent to controller 204, which then sends an updated control signal 205 the plant 206. Model reference control is based upon matching the response of a system or "plant" to that of a reference model or "model". Plant design specifications are often incorporated within the model such that a step input to the model would cause its outputs to respond with the specified rise time, overshoot, and settling time. The reference inputs are fed into the model, which responds in accordance with the design specifications that have been built into it. If the control system is properly designed, the inputs to the plant (which are generated from the model inputs, the model states, and the error between plant and model outputs) drive the outputs of the plant to equal the outputs of the model.

For the servo simulator, plant 206 is represented by piston 1, linkage 2 and motor 3, plus motor controller interface 8 and motor controller system 4. Model 200 is a one or two compartment lung model with an active chest wall component, and the controller 204 is model reference controller 11.

The mathematical model of the lungs is derived from an "equivalent" electrical circuit as described below. The following equivalent terms are used in the derivation:

| symbol | electrical model | lung model |
| --- | --- | --- |
| v(t) | voltage (volts) | pressure(cmH2O) |
| i(t) | current (amps) | air flow (cmH2O/s) |
| R | resistance (ohms) | resistance(cmH2O/l/s) |
| C | capacitance (farads) | compliance (l/cmH2O) |

Figure 3:
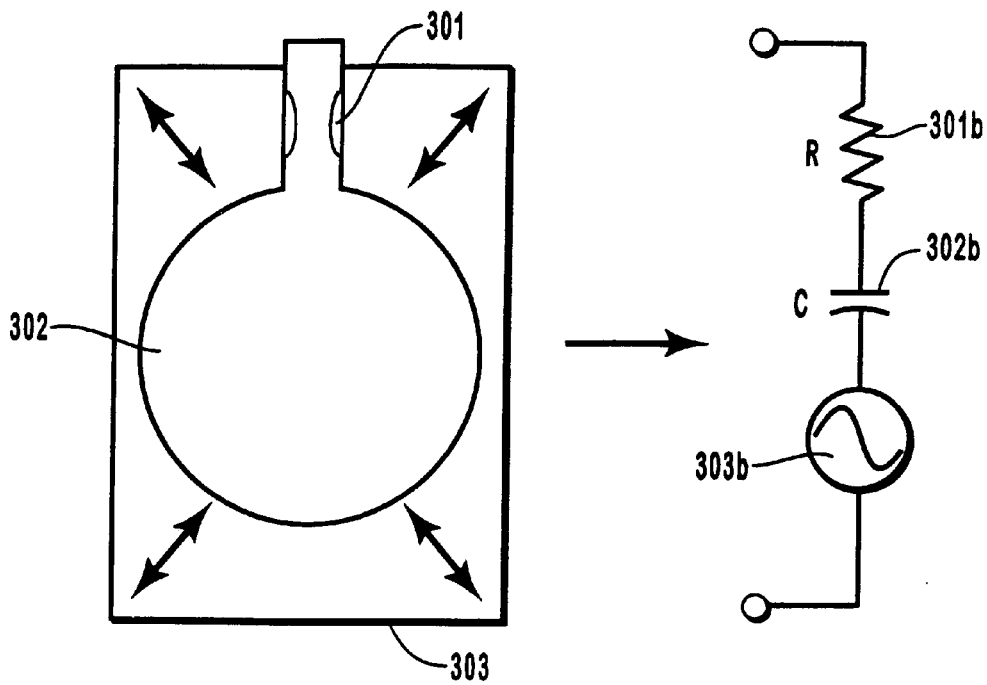
FIG. 3 depicts a single compartment mechanical lung model and its electrical analogy.

The goal is to express the lung volume as a function of current pressure, lung resistances, and lung compliances. The lung can be modelled simply as a balloon in a box, as shown in FIG. 3. The balloon 302 has a given compliance, C, and the balloon opening 301 imposes a certain resistance, R. All resistances and compliances are assumed to be constant values that are not a function of time, flow or volume. The box wall 303 can expand or contract generating positive or negative pressure surrounding the balloon (this corresponds to the movement of the chest wall and diaphragm). The electrical analog of the single lung model resistor 301b with resistance R, a capacitor 302b with capacitance c, and voltage source 303b which corresponds to chest wall pressure source 303. The derivation of an expression relating input pressure from the ventilator to resulting volumes for the mechanical piston is shown below.

In the continuous domain, the voltage is expressed as:

$$v(t) = R\, i(t) + 1/C \int i(t)\, dt \qquad \text{eqn(1)}$$

where the integration is from 0 to t.

In the discrete domain, equation (1) becomes $$v[n] = R\, i[n] + 1/C \Sigma i[k] \delta \qquad \text{eqn(2)}$$

where the summation is from 0 to n, and $\delta$ is the time between samples. The summation of the current $i[k]$ is equivalent to charge $Q[n]$, and the current $i[n]$ can be expressed as $(Q[n]-Q[n-1])/\delta$. Equation (2) can now be expressed as:

$$v[n] = R\, (Q[n]-Q[n-1])/\delta + Q[n]/C \qquad \text{eqn(3)}$$

We can now switch to pulmonary terms by making the following substitutions in equation(3):

$v[n] = p[n]$, where $p[n]$ is pressure at sample n;
$Q[n]$ vol$[n]$; where vol$[n]$ is lung volume at sample n.
Then Equation (3) becomes $$p[n] = R\, (\text{vol}[n]-\text{vol}[n-1])/\delta + \text{vol}[n]/C \qquad \text{eqn(4)}$$

Equation (4) can now be solved for vol[n]

$$\text{vol}[n] = (p[n]+R\, \text{vol}[n-1]/\delta)/(R/\delta+1/C) \qquad \text{eqn(5)}$$

Equation (5) expresses the current lung volume (at sample n) in terms of the current pressure, previous lung volume (at sample n), lung resistance, lung compliance and the sample interval.

In order to determine the desired plant performance, the model must convolve the impulse response of the single compartment lung model with the input pressure signal as a function of time. In order to do this, the convolution must be represented in the form of a mathematical equation, preferably in recursive form.

Figure 4:
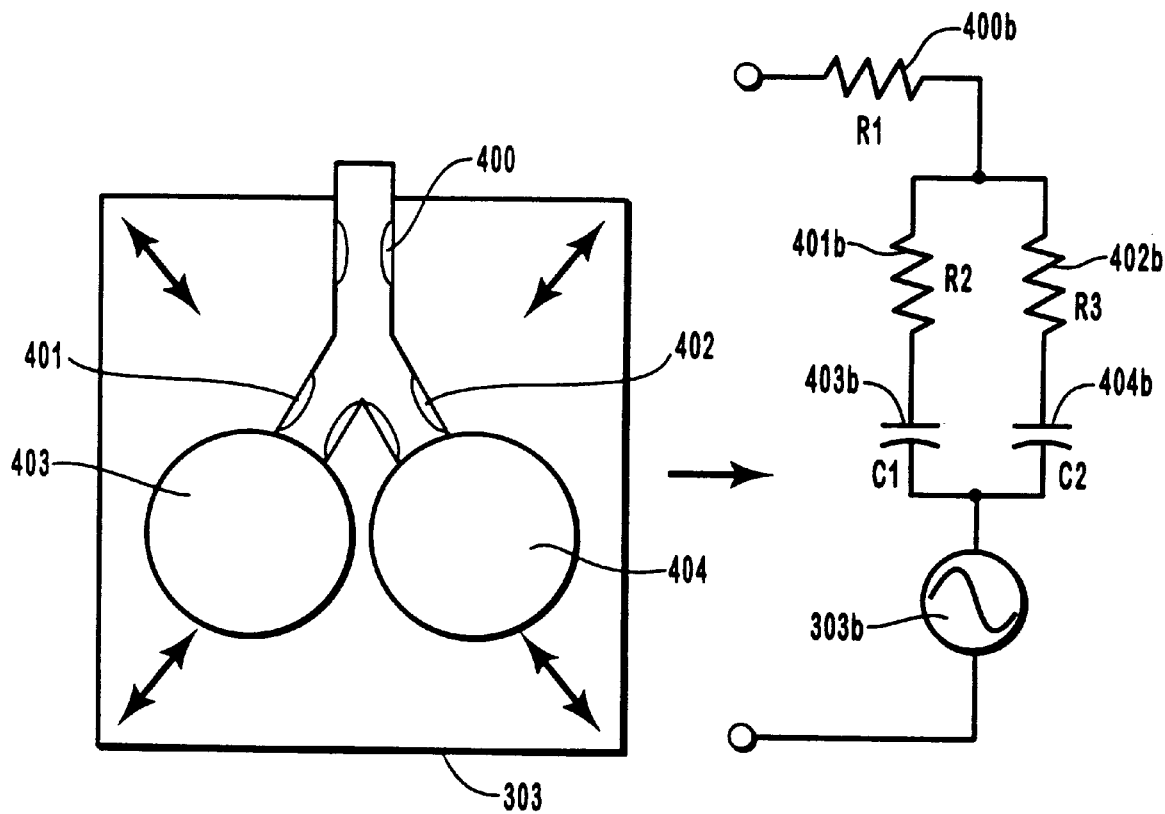
FIG. 4 depicts a two compartment mechanical lung model and its electrical analogy.

FIG. 4 summarizes the mechanical two compartment lung model and its electrical analogy. In this model the lung is represented by two balloons in a common box. The balloons 403 and 404 each have a given compliance (403b and 404b with capacitances of C1 and C2 in the electrical analog), and the opening in each balloon, 401 and 402, respectively, imposes a certain resistance (resistors 401b and 402b, with resistances R2 or R3 in the electrical analog). A common connection 400 to the two balloons imposes a resistance R1 (resistor 400b in the electrical analog). All resistances and compliances are assumed to be constant values that are not a function of time, flow or volume. The box walls 303 can expand or contract generating positive or negative pressure surrounding the balloons to represent the activity of the chest wall and diaphragm represented by voltage source 303b.

The mathematical expression for the volume of the double chamber lung model is very similar to that of the single chamber. The volume for each chamber is found by solving two equations simultaneously. In the pulmonary terminology the two equations are as follows:

$$p := R1\left(\frac{v1-v1o}{\delta} + \frac{v2-v2o}{\delta}\right) + \frac{R2(v1-v1o)}{\delta} + \frac{v1}{c1}$$

and $$\frac{R2(v1-v1o)}{\delta} + \frac{v1}{c1} = \frac{R3(v2-v2o)}{\delta} + \frac{v2}{c2}$$

where $\delta$ is the sample interval. The volume terms v1o and v2o are the previous volumes for the chamber one and chamber two respectively. After solving these two equations simultaneously, values for the volumes of each chamber can be found. The volume of chamber one is v1 and the volume for chamber two is v2.

v1=(a+b) c1/denominator
v2=(c+d) c2/denominator
where
a=R1 δv1o+R3 c2 R2 v1o+δR2 v1o+R2 c2 R1 v1o
b=R3 c2 R1 v1o+R1 v2o δ+c2 R3 δp+p δδ
c=R1 δv1o+p c1 R2 δ+p δδ+R1 v2o δ
d=R3 v2o δ+R1 v2o c1 R2+R3 c1 R1 v2o+R3 c1 R2 v2o
denominator=R1 δc1+δδ+c2 R3 δ+c2 R1 δ+R3 c1 c2 R2+δc1 R2+R2 c1 c2 R1+R3 c1 c2 R1

Whether the one or two chamber model is used, the resistance and compliance values are specified by the user, and the pressure and volume values are measured from the piston (or alternate physical lung model) and sent to the model. The invention is not limited to the first and second order models presented herein. The invention may be used with other numerical models which represent the lungs as well.

CHEST WALL MODELS

The chest wall is modeled as a time varying pressure source. This pressure profile is loaded from a file. Two simple patterns necessary for testing triggering and spontaneous breathing can be generated by the software of the presently preferred embodiment. It is possible to use Excel or Word to create a pressure profile of any type. Actual esophageal pressure tracings from patients could also be used.

The two most common chest wall functions needed for testing mechanical ventilators which are included in the present software, are triggering during controlled modes (pressure control, volume control, etc), and a simple single exponential model of the chest wall during spontaneous inspiration and a passive expiration. The spontaneous inspiration chest wall model would to be used with all of the other non-controlled modes of mechanical ventilation (pressure and volume support, cpap, SIMV, etc). In both cases, the chest wall should be modeled as a time varying pressure or flow source which is included in the one and two compartment lung models. The chest wall model should be expressed in the form of a mathematical equation that can be integrated into the convolution equations in the lung models.

Figure 5:
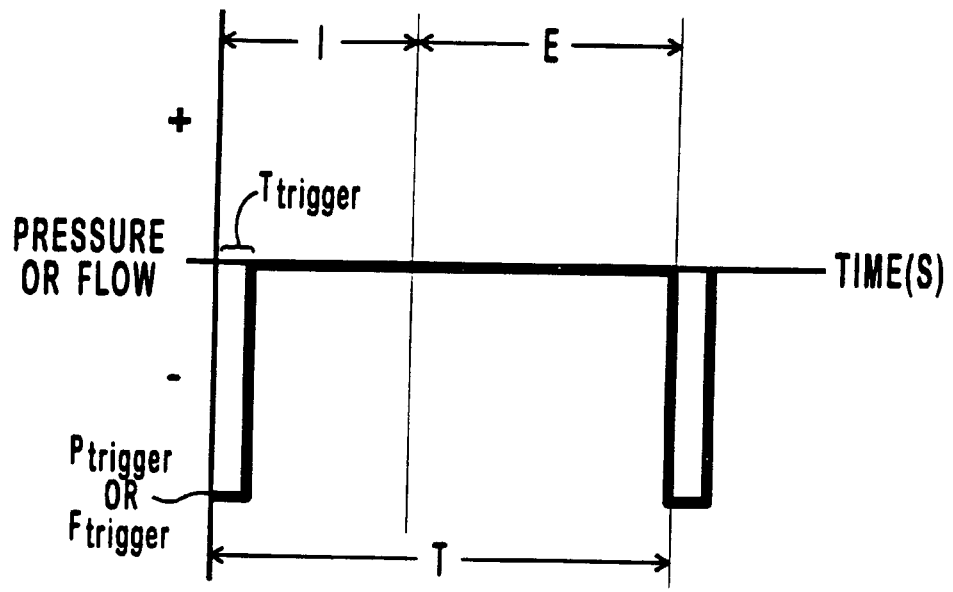
FIG. 5 depicts a chest wall model for triggering.

FIG. 5 illustrates the pressure (or flow) pattern of the simple triggering chest wall model as a function of time during inspiration and expiration. This chest wall model provides a user chosen constant negative triggering pressure or flow which lasts a user specified time $T_{trigger}$. $T_{trigger}$ must be less than the I (inspiration) time set on the ventilator. The user must be able to specify the rate of triggering (triggers/minute) which will be used to determine the interval between triggering events. The period between triggering events should be equal to or less than the total period and greater than the I time set on the ventilator. The chest wall model should verify that the user's choices meet the above constraints and warn the user if they do not.

Figure 6:
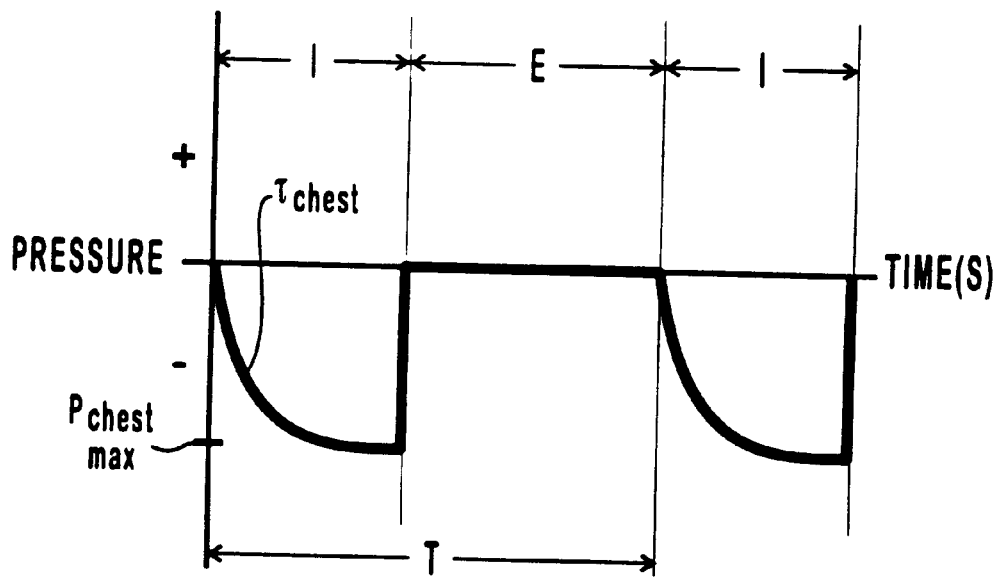
FIG. 6 depicts a chest wall model for spontaneous respiration.

FIG. 6 illustrates the pressure or flow pattern of the simple spontaneous inspiration chest wall model as a function of time during inspiration and expiration. The chest wall model uses a single exponential model for the pressure generated by the chest wall during inspiration. Expiration is totally passive. The chest wall model should allow the user to choose the maximum chest wall pressure gradient ($P_{chest\ max}$). The user should also be able to specify the time constant of the inspiratory effort ($T_{chest}$) and the duration of inspiration (I). The user must be able to specify the rate of spontaneous ventilation (breaths/minute) which will be used to determine the interval between inspiratory events. The period between spontaneous breaths should be greater than I. The chest wall model should verify that the users' choices meet the above constraints and warn the user if they do not.

Motor controller driver 12 functions as the link between all of the software modules and the motor control interface board. The majority of the driver software should be commercially available software that is compatible with the motor controller interface 8, motor controller system 4 and the motor 3.

The user interface 13 should provide a software interface between the user and the servo lung simulator. The user interface module should provide an effective means for the user to enter information, control the servo lung simulator, monitor system functions and view results. In the preferred embodiment of the invention a "what you see is what you get" windows style interface should be used.

The user interface is illustrated by the following example:

When the Servo Lung Simulator (SLS) is started up, the program will display the following main screen. From here, the user may either change variables, or control the lung simulator. Typing the Escape Key (ESC) will quit from the SLS program and return you to windows.

---
Type the appropriate letter:
   c) To change Variables
   r) To Run Servo Lung Program
   ESC) Return to Exit Program
---

To change parameters, the user must type 'C'. This will cause the change variables menu to be displayed.

---
Type the letter for the variable that you want to change:
a) lung_model
b) spont_breath
c) data_storage
  s) Save Current Parameters     r) Restore Saved Parameters
ESC) Return to Main Menu     C) Exit to DOS
---

From the change variables menu, the user may either store all of the parameters to a file, retrieve all of the old parameters from a file, or change a single variable in a particular class. To change a variable, type the appropriate letter for the class. This will bring up the proper parameter class menu. Typing ESC will cause the program to return to the main menu.

When the appropriate class menu is displayed, the user selects the variable to change by typing the letter in the left column. The user is then prompted to change the variable. The user should type ESC to return to the change variables menu. Typing ESC again will cause the program to return to the main menu.

To change the lung model parameters, the user must choose option a from the menu. The following screen will be displayed:

---
Type the letter for the variable that you want to change:
| | | |
|---|---|---|
| a) r_trachia: | 10.00000 | (cm-H2O/(l/sec) |
| b) r_left: | 10.00000 | (cm-H2O/(l/sec) |
| c) r_right: | 10.00000 | (cm-H2O/(l/sec) |
| d) c_left: | 5.00000 | (ml/cm-H2O) |
| e) c_right: | 5.00000 | (ml/cm-H2O) |
| f) function_residual_capacity: | 3.00000 | (liters) |
| ESC) Return to Main Menu | z) Temp Exit to DOS | C) Exit to Dos |
---

The user then enters the letter for the variable to be changed, and then the desired value for the variable.

To change the spontaneous breathing parameters, choose option b from the menu. The following screen will be displayed:

```
Type the letter for the variable that you want to change:
a) spontaneous_breathing_flag:          1              (??)
b) read_spont_breath_file_flag:         0              (??)
c) spont_breath_input_file_name:        breath.in
d) spont_breath_output_file_name:       breath.out
e) spont_breath_file_drive:             c:
f) spont_breath_file_directory:         \ser_lung\
g) spontaneous_breathing_rate:          10
(breaths/minute)
h) spont_inspire_percent:               20.00000       (percent)
i) spont_pause_percent:                 20.00000       (percent)
j) spont_expire_percent:                20.00000       (percent)
k) spontaneous_sine_wave_flag:          0              (yes/no)
l) spontaneous_amplitude_flag:          3              (type)
m) spont_breath_esophageal_pressure     30.00000       (cm-H2O)
n) spont_breath_airway_pressure:        30.00000       (cm-H2O)
o) spont_breath_flow:                   1.00000        (liters/min)
ESC) Return to Main Menu    ^z) Temp Exit to DOS    ^C) Exit
to Dos
```

Depending on which variable is selected, the user can then enter various sorts of information, as follows:

a) spontaneous_breathing_flag

For spontaneous breathing or for triggering: set the variable spontaneous_breathing_flag to a 1. For no spontaneous activity, set this variable to 0.

b) read_spont_breath_file_flag

To read the spontaneous breathing pressure profile from the input file (determined by spont_breath_input_file_name), set the variable read_spont_breath_file$_{13}$ flag to a 1. To generate the spontaneous breathing pressure profile (and to send the generated pressure profile to the output file determined by spont_breath_output_file_name), set this variable to 0.

c) spont_breath_input_file$_{13}$ name

File name for an input file of chest wall pressures. This would be used to read previously created spontaneous breathing patterns.

d) spont_breath_output_file_name

File name to receive a new spontaneous pattern created by this program. This pattern can then be used for future testing.

e) spont_breath_file_drive

Drive name for the disk drive where the spontaneous breathing files (c and d above) are located (i.e. C:)

f) spont_breath_file_directory

Path and directory for. the location of the spontaneous breathing files ( for example: \ser_lung\)

g) spontaneous_breathing_rate

The number of spontaneous breathing efforts per minute. In general, this value should be greater than 3 and less than 60. In SIMV modes, this setting should be greater than the SIMV rate setting.

h) spont_inspire_percent

The portion of the total period that will have an inspiratory spontaneous effort.

i) spont_pause_percent

The portion of the total period that will have a pause in the spontaneous effort between inspiration and expiration (See FIGS. 4 and 5)

j) spont_expire_percent

The portion of the total period that will have an expiratory spontaneous effort.

k) spontaneous_sine_wave_flag

Pressure pattern can either be a half sinusoid pattern or a ramp or trapezoidal pattern. For sinusoid, choose 0. For the ramp, choose 1.

l) spontaneous_amplitude_flag

Chooses from several different spontaneous effort patterns:

1— Use the esophageal pressures from a file or generated by the pattern information (h–j).

2— Create a triggering effort designed to reach an approximate airway pressure as set by spont_breath_airway_pressure (n).

3— Create a triggering effort designed to reach a flow rate specified by spont_breath_flow (o).

m) spont_breath_esophageal_pressure

Maximum amplitude of the spontaneous breathing effort. This is only relevant is spontaneous amplitude flag(l)=1.

n) spont_breath_airway_pressure

Minimum airway pressure to be achieved during triggering effort. This setting is only relevant when spontaneous amplitude flag (l)=2.

o) spont_breath_flow

Flow rate to be achieved during triggering effort. This setting is only relevant when spontaneous amplitude flag (l)=3.

To change the data storage parameters, option c must be selected from the change variable menu.

This will bring up the following screen:

```
Type the letter for the variable that you want to change:
a) write_sample_data_to_file_flag: 1      (flag)
b) output_file_name:    data
c) output_file_drive:   c:
d) output_file_directory:    \ser_lung\
ESC) Return to Main Menu    ^z) Temp Exit to DOS    ^C) Exit
to Dos
```

IMPORTANT: Make sure that you change the output file name between each simulation or your old files will be overwritten and lost.

Once all variables have been set as desired, the user can run the simulation by selecting option 'r' from the main menu. At this point, the computer will move piston 1a to the starting position. The computer will display a message Hit any Key to Continue. The user should then get the ventilator ready, and hit any key. At this point, the computer will begin controlling the lung simulator. While controlling the lung simulator, the computer will display real time data on the screen as follows:

| Hit Space bar to Terminate | | | | | |
|---|---|---|---|---|---|
| time (sec) | current pressure | breathing pressure | model left vol | model right vol | piston volume |
| 0.075 | 0.360 | 4.693 | 0.0011 | 0.0011 | −0.0072 |

To stop the simulation, the user must hit the SPACE BAR. This will cause the program to return to the main menu.

The data storage software module 14 interfaces between all of the software modules and the storage device in the computer. This module saves and retrieves information. This module also contains all of the global data definitions and data structures used by all of the software modules.

The system control software module 15 should be responsible for coordination of all activities in the Servo Lung Simulator. The system control software is responsible for the following functions: starting, stopping and emergency shutdown of the Servo Lung Simulator; monitoring of system performance; detection of system failure and implementation of appropriate response; passing essential information between software modules; control of sequence of execution of the software; timing of events; and management of interrupts.

Figure 7:
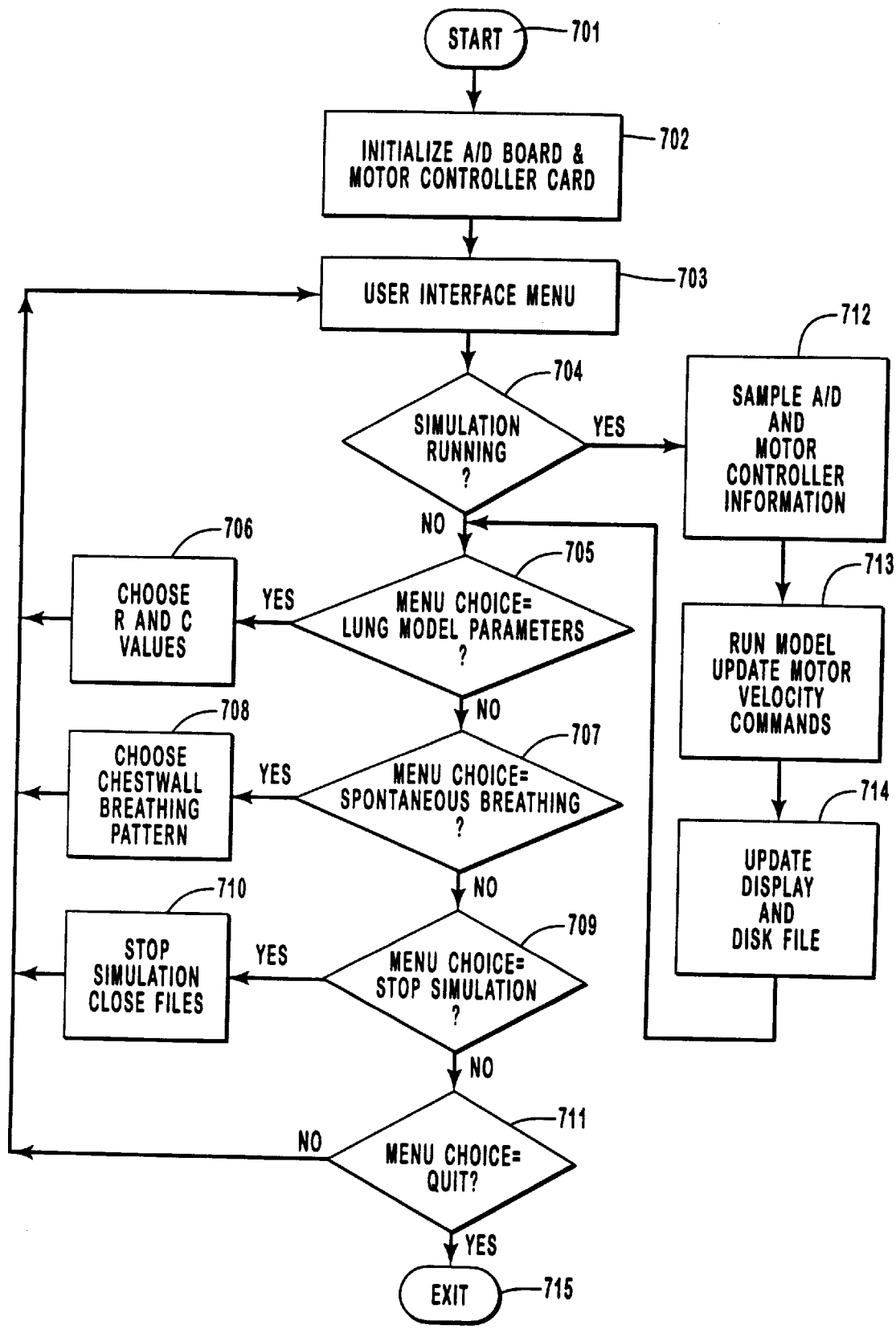
FIG. 7 is a flow diagram of the software.

The operation of the software is summarized in the flow diagram in FIG. 7. After the software is started, at step 701, the A/D board 7 and motor controller card 8 are initialized in step 702. The user interface menu is then displayed at step 703. If a run simulation command has not been entered as determined at step 704, at step 705 the software determines whether the user wishes to update lung model parameters. If so, at step 706 the user may enter now resistance and compliance values. If at step 707 it is found that a spontaneous breathing model is desired, at step 708 the user may select a chest wall breathing pattern. If at step 709 the menu choice was found to be "stop simulation," the simulation is shut down and files are closed at step 710. If the menu choice was "quit" as determined at step 711, program operation is quit at step 715. If no quit command was detected, or following steps 706, 708 or 710, program control loops back to the user interface menu at step 703. When at step 704 it is found that the simulation is to be run, data are sampled from A/D 7 and motor controller 4 (step 712). The model reference control is run and motor velocity commands are updated and sent to motor controller 4 (step 713). Finally, the display on video monitor 68 is updated as are data files on disk 62. If, when program control returns to step 705, no further command has been given (as determined at steps 705, 707, 709 or 711), program control returns to step 703 and then 704, and is collected and steps 712, 713 and 714 will be executed repeatedly until such a command is detected.

II. INDUSTRIAL APPLICABILITY

The following is a brief list of uses for the invented servo lung simulator:

a. The invented servo Lung simulator is designed to be used as a test lung for evaluating the performance of mechanical ventilators.

b. The invented servo lung simulator can be used in the laboratory for research and development purposes.

c. The invented servo lung simulator can be used on the assembly line of mechanical ventilator manufacturers as part of an automated Q/A process.

d. The invented servo lung simulator can be used for calibrating and testing of mechanical ventilators used in intensive care units by clinical engineering department of hospitals.

e. The invented servo lung simulator can be used for product development and demonstration for other pulmonary devices such as flow and pressure transducers and respiratory gas monitors.

f. The invented servo lung simulator can be used as a teaching instrument for students interested in pulmonary physiology and lung mechanics.

A listing of computer source code used to control the servo lung simulator is provided below. The source code is in the Pascal programming language for use on a personal computer with a TURBO PASCAL compiler.

```
program TRIAL;
(*       Servo Lung Simulaton
         Pulmonary Lab
         LDS Hospital
         Salt Lake City Utah *)
(*       This program has the following features:
         USES the Galil 1010 board
         Double-Chamber volume transfer function
         Differention volume flow
         External triggering established by counter 1
         Five sample pressure filtering
         Flow adjustment is set at 2
         Write data to files
         Simple Triggering using Boyle's law: p1*v1 = p2*v2.
         This program also implements serial communications
         to Mac. This program is configured to com2.
*)
uses crt, nidaq, errpr, 1trial;
var
    n, i,
    Trig_cnt,
    startTrig,
    extConv,
    board,
    chan,
    gain,
    ctr,
    readingAvailable,
    reading,
    timebase,
    status         :  integer;
    resolution,            (* steps per liter *)
    savecount,
    pauscnt,
    breathcnt,
    count,
    steps          :  longint;
    R,
    R1,
```

-continued

```
        R2,
        C1,
        C2,
        delta,
        sum,
        temp,
        freq,
        duty,
        flow_cur,
        flow_adj,
        flowp_cur,
        brate,
        pres_spon,
        pres_cur,
        pres_prev,
        pres_peak,
        PEEP,
        pres_atm,
        vol_trig,
        vol_dead,
        vol_dead1,
        vol_cur,
        vol1_cur,
        vol2_cur,
        vol_prev,
        vol1_prev,
        vol2_prev,
        volp_cur,
        volp_prev,
        volp_max,
        volp_min,
        volp_mino,
        volp_maxo,
        vol_e,
        frc,
        rpm,
        denomv,
        Trig_Flow,
        Trig_Pres,
        Trig_Level,
        Trig_Dur,
        Trig_Val,
        Trig_Rate     :    single;
        voltage       :    double;
        newbreath,
        savedata,
        exit,
        SIMV,
        Triggering,
        Trig_flag     :    boolean;
        pres_paus     :    array[1..25] of single;
        flowp         :    array[1..4] of single;
        flowf         :    array[1..9] of single;
        volt_read,
        volt_sort     :    array[1..7] of single;
        code,
        period1,
        period2       :    word;
        Start,
        Stop          :    real;
        AC,
        GN,
        FLOW,
        command,
        ptn,
        result,
        datfile,
        parfile   :    string;
        ch,
        key           :    char;
        F,S           :      text;
        Lst       :    file of single;
        label 1,2;
begin
        Assign(Lst, 'COM2');
        Rewrite (Lst);
        (* set default parameters for test lung *)
        frc           := 300/1000;
        freq          := 400;
        R             := 50;
```

-continued

```
    R1          := 50;
    R2          := 50;
    C1          := 10/1000;
    C2          := 10/1000;
    datfile     := 'dat';
    (* set NI DAQ board constants *)
    ctr         := 1;
    board       := 2;
    chan        := 0;
    gain        := 1;
    duty        := 0.5;
    startTrig   := 0;
    extConv     := 1;
    Trig_Flag   := false;
    Triggering  := false;
    (* set default triggering parameters *)
    Trig_Rate   := 5;       (* br/min *)
    Trig_Level  := -10;     (* cmH2O *)
    vol_dead    := 2.0;     (* liter *)
    pres_atm    := 875;     (* cmH2O *)
    (* conversion constant relating encoder counts to piston volume *)
    resolution:= 8633;      (* steps per liter *)
    clrscr;
    (* dead space measurements, ventilator end of circuit to be ocluded *)
    writeln('Do you wish to do DEAD SPACE testing? ');
    repeat
            key := readkey;
    until (key = 'y') or (key = 'Y') or (key = 'n') or (key = 'N');
    if (key = 'y') or (key = 'Y') then
        begin
            EnableMovement;
            StartPosition(resolution, frc);
            SendCommand( 'DP0');
            DeadSpaceN(vol_dead1);
            vol_dead1 := vol_dead;
            DisableMovement;
            key := readkey;
            writeln('The dead space is: ',round(vol_dead*1000), 'ml');
            repeat until keypressed;
            key := readkey;
        end;
    writeln('Do you wish to do SIMV testing? ');
    repeat
            key := readkey;
    until (key = 'y') or (key = 'Y') or (key = 'n') or (key = 'N');
    if (key = 'y') or (key = 'Y') then SIMV := true else SIMV := false;
1:
    (* set initial conditions for control loop variables *)
    Trig_cnt    := 0;
    savecount   := 0;
    count       := 0;
    vol_prev    := 0;
    vol1_prev   := 0;
    vol2_prev   := 0;
    volp_cur    := 0;
    brate       := 100;
    pres_peak   := 0;
    PEEP        := 150;
    volp_max    := 0;
    volp_min    := 0;
    volp_maxo   := 0;
    volp_mino   := 0;
    pauscnt     := 0;
    breathcnt   := 0;
    newbreath   := false;
    ch          := 's';
    (* call to lung set-up menu *)
ParamMenu2 (R, R1, R2, C1, C2, frc, Trig_Flow, Trig_Pres, Trig_Dur, Trig_Rate, datfile, Trig_F
lag, exit);
    if exit = true then goto 2;
    delta       := 1/freq;
    (* calculate the volume denominator for the math model *)
    denomv:= R*C1*delta + delta*delta + C2*R2*delta + C2*R*delta;
    denomv:= denomv + R2*C1*C2*R1 + R1*C1*delta + R1*C1*C2*R +
R2*C1*C2*R;
    (* open data file for storing lung simulator results *)
    (* Assign(F,datfile);
    Rewrite(F); *)
    Assign(F, datfile);
            Rewrite(F);
```

```
            writeln(F, 'Peak Pres.,PEEP,INVT,EXVT,Br.Rate');
(* initialize pressure transducer array to zero *)
for i := 1 to 7      do volt_read[i]   := 0.0;
(* initiaiize pause pressure and flow array to zero *)
for i := 1 to 25     do pres_paus[i]   := 0.0;
for i := 1 to 9      do flowf[i]       := 0.0;
(* configure NI DAQ board for sample timeing and data collection *)
status       := AI_Clear(board);
status       := AI_Setup(board, chan, gain);
status       := DAQ_Config(board, startTrig, extConv);
status       := CTR_Rate(freq, duty, timebase, period1, period2);
status       := CTR_Square(board, ctr, timebase, period1, period2);
EnableMovement;
StartPosition(resolution, frc);
(* initialize motion controller parameters *)
result       := sendcommand('KI0');
result       := sendcommand('KP1');
result       := sendcommand('KD19');
result       := sendcommand('FA2');
result       := sendcommand('AC2000000');
result       := sendcommand('GN19');
result       := sendcommand('ZR0.9486');
result       := sendcommand('JG0');
result       := sendcommand('DP0');
result       := sendcommand('BGX');
(* write data file column titles *)
(* writeln(F, 'sample,pressure,vol_calulated,vol_piston, flow_piston'); *)
(* alternate file titles *)
(* writeln(F, 'sample,pressure,flow, flowadj ,volc,vola,vole') ;*)
Sound(3000);
Delay(300);
NoSound;
textcolor(10);
gotoxy(14,19);
write('Breath calculations');
textcolor(3);
gotoxy(14,20);
write('Peak Pressure:           cmH2O');
gotoxy(13,21);
write ('Pause Pressure:          cmH2O');
gotoxy(14,22)
write('       PEEP:             cmH2O');
gotoxy(14,23);
write('         Insp. VT:       ml');
gotoxy(14,24);
write('         Exp. VT:        ml');
gotoxy(14,25);
write(' Breath rate:            b/min');
textcolor(10);
(* get the start time for verifying control loop rate *)
    Start    := Time;
    repeat
        begin
        (* wait until pressure sample is ready, based on timing signal *)
        repeat
            begin
            status := AI_Check(board, readingAvailable, reading);
            end;
        until readingAvailable = 1;
        status := AI_VScale(board, chan, gain, 1, 0, reading, voltage);
        (* five sample filter for pressure signal, find median value *)
        for i := 1 to 6 do volt_read[i] := volt_read[i+1];
        volt_read[7] := voltage;
        for i := 1 to 7 do volt_sort[i] := volt_read[i];
        for i := 1 to 6 do
            begin
                for n := 1 to 7 do
                    begin
                        if volt_sort[n] < volt_sort[i] then
                            begin
                                temp          := volt_sort[i];
                                volt_sort[i]  := volt_sort[n];
                                volt_sort[n]  := temp;
                            end;
                    end;
            end;
        pres_cur := volt_sort[4] * 10.6;
        (* pressure limit, exit control loop *)
        if pres_cur < -100 then goto 2;
        if pres_cur > 150 then goto 2;
```

```
            if SIMV then pres_spon := spon(15,12,count) else pres_spon := 0;
     pres_cur := pres_cur + pres_spon;
            (* volume calculations based on math model *)
            vol1_cur := R*delta*vol1_prev + R2*C2_R1*vol1_prev + R1*delta*vol1_prev +
            R1*C2*R*vol1_prev;
            vol1_cur := vol1_cur + R2*C2*R*vol1_prev + R*vol2_prev*delta +
C2*R2*delta*pres_cur + pres_cur*delta*delta;
        vol1_cur := vol1_cur*C1/denomv;
        vol2_cur := R*delta*vol1_prev + R1*C1*pres_cur*delta + pres_cur*delta*delta
+ R*vol2_prev*delta + R2*vol2_prev*delta;
            vol2_cur := vol2_cur + R1*C1*R*vol2_prev + R2*C1*R*vol2_prev +
R2*C1*R1*vol2_prev;
        vol2_cur := vol2_cur*C2/denomv;
        vol_cur := vol1_cur + vol2_cur;
        pres_cur := pres_cur - pres_spon;
        (* volume limit, exit control loop *)
        if vol_cur < -frc-0.05 then goto 2;
        if vol_cur > 1.8-frc then goto 2;
        (* calculate flow *)
        flow_cur:= (vol_cur - vol_prev)/delta;
        vol_prev      := vol_cur;
        vol1_prev     := vol1_cur;
        vol2_prev     := vol2_cur;
        (* interrogate encoder for piston position *)
        result := sendcommand( 'TPX' );
        val (result,steps,code);
        volp_cur := -steps/resolution;
        (* calculate error between math model volume and piston volume *)
        vol_e := vol_cur - volp_cur;
        (* adjust the flow to compensate for volume error *)
        flow_adj := flow_cur + vol_e * 2;
        (* calculate flow command for JOG motion control *)
        str(round(flow_adj * -resolution), FLOW);
        (* calculate desired rpm of motor *)
        rpm := flow_adj * resolution * 0.015;
        for i := 1 to 3 do flowp[i] := flowp[i+1];
        flowp[4] := (volp_cur - volp_prev)*freq;
        volp_prev := volp_cur;
        (* breath data analyst - based on piston values *)
        if (count mod 4 = 0) then
        begin
        flowp_cur := 0;
        for i := 1 to 4 do flowp_cur := flowp_cur + flowp[i]/4;
        for i := 1 to 8 do flowf[i] := flowf[i+1];
        flowf[9] := flowp_cur;
        (* determine start of breath *)
        if (flowf[1] <= 0) and (flowf[5]> 0) and (flowf[5]) then
        newbreath := true;
        if newbreath and (breathcnt < 40) then newbreath := false;
        if triggering then newbreath := false;
        if newbreath = true then
            begin
                temp := freq/4 * 60 / breathcnt;
                textcolor(10);
                if (temp < brate * 0.95) or (temp > brate * 1.05) then textcolor(12);
                brate := temp;
                sound(2000);
                delay(10);
                nosound;
                gotoxy(34,20);
                write(round(pres_peak), ' ');
                gotoxy(34,21);
                write(' ');
                gotoxy(34,22);
                write(round(PEEP), ' ');
                gotoxy(34,23);
                write(round((volp_max - volp_mino)*1000),' ');
                gotoxy(34,24);
                write(round((volp_max - volp_min)*1000),' ');
                gotoxy(34,25);
                write(round(brate),' ');
                    writeln(F,round(pres_peak), ',',round(PEEP), ', ',round( (volp_max -
volp_mino) *1000), ','
                                            ,round( (volp_max -
volp_min) *1000), ',',round(brate));
                pres_peak     := 0;
                PEEP          := 150;
                volp_maxo     := volp_max;
                volp_mino     := volp_min;
                volp_max      := 0;
```

```
                volp_min         := 3;
                breathcnt        := 0;
                newbreath        := false;
            end;
            (* close(S) ; *)
        inc (breathcnt);
        if pres_cur > pres_peak then pres_peak := pres_cur;
        if(not triggering) and (pres_cur < PEEP) then PEEP := pres_cur;
        if volp_cur > volp_max then volp_max := volp_cur;
        if volp_cur < volp_min then volp_min := volp_cur;
        if (flowf[1] >= 0) and (flowf[5] < 0) and (flowf[9] < flowf[5]) and (pauscnt
> 40)then
            begin
                pauscnt := 0;
                gotoxy(34,21);
                write(round(pres_paus[1]), ' ');
            end;
        inc(pauscnt);
        volp_prev := volp_cur;
        pres_prev := pres_cur;
        for i := 1 to 24 do pres_paus[i] := pres_paus[i+1];
        pres_paus[25] := pres_cur;
        end;
        (* Triggering function *)
        if Trig_flag = true then
            begin
                if (count mod round(60*freq/Trig_Rate)) = 0 then
                begin
                    Triggering       := True;
                    Trig_cnt         := 0;
                    vol_trig         := ((volp_cur+vol_dead+frc) * (pres_cur+pres_atm) /
(pres_atm-abs(Trig_Pres))) - vol_dead - frc;
                end;
            end;
        if Triggering then
            begin
                if (Trig_cnt*delta*1000 > Trig_Dur) then Triggering := false;
            end;
        if Triggering then
            begin
                if (volp_cur > vol_trig) then
                    begin
                        FLOW := '0';
                    end
                else
                    begin
                        str(round(Trig_Flow * -resolution), FLOW);
                    end;
                inc(Trig_cnt);
            end;
        (* send jog command to motion control board *)
        command := 'JG'+ FLOW;
        result := SendCommand(command);
        if keypressed then ch := readkey;
        (* initiates 10 seconds of data collection when 'F1' is pressed *)
        if (datfile <> 'None') and (ord(ch) = 59) and (savecount = 0) then
            begin
                savedata := true;
                savecount:= round(freq) * 10;
                ch := 's';
            end;
        if savecount = 0 then savedata := false;
        if savedata then
            begin
writeln(F,int(count/4),',',pres_cur,',', vol_cure,',',volp_cur,',',flowp_cur); *)
                (* alternate data file values *)
                (*
                            (*  if   (savecount  mod  4  =  0)  then
writeln(F,count, ', ',pres_cur, ', ',flow_cur, ',',flow_adj, ',',vol_cur, ', ',volp_cur, ',
',vol_e); *)
                (*if (savecount mod 8 = 0) then Write(Lst,pres_cur,volp_cur); *)
                dec(savecount);
            end;
            inc(count);
        end;
    (* remain in control loop until space bar is pressed *)
    until ord(ch) = 32;
2:
    (* stop motor motion and reset motion control board *)
    SendCommand( 'STX' );
```

```
      SendCommand( 'CB0' );
      SendCommand( 'RS' );
      (* get stop time to verify control loop frequency *)
      Stop := Time;
      (* stop NI DAQ board *)
      CTR_Stop(board, ctr);
      if exit = false then close(F);
      Sound(1000);
      Delay(100);
      NoSound;
      Delay(100);
      Sound(1000);
      Delay(150);
      NoSound;
      textcolor(15);
(*    gotoxy(1,24);
      write ('
                                                       ');
      gotoXY(47,24);       *)
      gotoxy(54,24);
      (* calculate control loop frequency *)
      write(' Freq = ',round(count/(Stop-Start)),'              ');
      gotoxy(54,25);
      write(' More Testing? (y/n)');
      key := readkey;
      if (key <> 'n') and (key <> 'N') then goto 1;
      Close(Lst);
end.
    unit TRIAL1010;
    (* Jeffrey R. Anderson
    Jay Trivedi
    LDS Hospital
    Pulmonary Division
    8th Ave & C Street
    Salt Lake City, UT 84143
    This unit is used with G1010.PAS lung simulator code. *)
interface
uses crt, dos, nidaq;
function SendCommand(Text : string) : string;
function SendPacket(n : integer; dx : integer) : integer;
function HomeSwitch : boolean;
function ForwardSwitch : boolean;
function Time : real;
function Spon(Amp : real; br : integer; cnt : longint) : double;
procedure StartPosition(var res:longint; var afrc : double);
procedure InitialValues;
procedure EnableMovement;
procedure DisableMovement;
procedure DeadSpaceN(var vd : double);
procedure ParamMenu2(var r,r1,r2,c1,c2,f,tf,tp,td,tr : double; var df : string;
var tflg,ex : boolean);
procedure FlushReadBuffer;
implementation
function SendCommand(Text : string) : string;
(* send command to motion control board *)
var Junk : char;
     x, TimeOut1, TimeOut2 : integer;
     Result : string;
begin
   { Send each character of the command }
   for x := 1 to length(Text) do begin
      repeat until ((Port[1000 + 1] and 16) = 0);
      Port[1000] := ord(UpCase(Text[x]));
   end;
   { Send the semi-colon terminator }
   repeat until ((Port[1000 + 1] and 16) = 0);
   Port[1000] := ord(';');
   { Wait for command response }
   Result := ' ';
   x := 0;
   FlushReadBuffer;
   repeat
      repeat until ((Port[1000 + 1] and 32) = 0);
      Junk := chr(Port[1000]);
      if ((Junk <> ':') and (Junk <> chr(13))
      and (Junk <> chr(10))) then begin
      Result := Result + Junk;
         x := x + 1;
      end;
      until ((Junk = ':') or (x > 127));
```

```
        SendCommand := Result;
end;
function SendPacket(n : integer; dx : integer) : integer;
(* send contour mode data to motion control board *)
(* currently not used *)
var hb, lb : byte;
begin
        repeat until ((Port[1000 + 1] and 4) = 0;
        hb := hi(dx);
        lb := lo(dx);
        repeat until ((Port[1000 + 1] and 2) = 2);
        Port[1000] := 128;
        repeat until ((Port[1000 + 1] and 2) =2);
        Port[1000] := 128 + n;
        repeat until ((Port[1000 + 1] and 2) = 2);
        Port[1000] := hb;
        repeat until ((Port[1000 + 1] and 2) = 2);
        Port[1000] := lb;
        repeat until ((Port[1000 + 1] and 2) = 2);
        Port[1000] := 0;
        repeat until ((Port[1000 + 1] and 2) = 2);
        Port[1000] := 0;
        repeat until ((Port[1000 + 1] and 2) = 2);
        Port[1000] := 0;
        repeat until ((Port[1000 + 1] and 2) = 2);
        Port[1000] := 0;
end;
function HomeSwitch: boolean;
(* detects activation of home switch *)
var MotorResp : string;
        Result, Flag : integer;
begin
        MotorResp := SendCommand('TI');
        val(MotorResp, Result, Flag);
        if (Result = 254) then
                HomeSwitch := true
        else
                HomeSwitch := false;
end;
function ForwardSwitch: boolean;
(* detects activation of forward switch *)
var MotorResp : string;
        Result, Flag : integer;
begin
        MotorResp := SendCommand('TI');
        val(MotorResp, Result, Flag);
        Delay(50);
        if (Result = 253) then
        ForwardSwitch := true
        else
                ForwardSwitch := false;
end;
function Time: real;
(* get current time from PC's timer *)
var h,m,s,sx100: word;
begin
        GetTime(h, m, s, sx100);
        Time := h*3600 + m*60 + s + sx100/100;
end;
function Spon(Amp : real; br : integer; cnt : longint) : double;
var x:real;
begin
        x := Amp * Sin (2*Pi*cnt*br/(60*400));
        if (x < 0) then x := 0;
        Spon := x;
end;
procedure StartPosition(var res:longint; var afrc : double);
(* moves the pistion to initial position including any FRC *)
var position : string;
begin
        SendCommand('JG2000');
        delay(200);
        SendCommand('BGX');
        repeat until ForwardSwitch;
        SendCommand('STX');
        Delay(200);
        str(round(afrc * res + 1000), position);
        SendCommand('PR-' + position);
        SendCommand('BGX');
        SendCommand('AMX');
```

```
            SendCommand('STX');
            Delay(200);
end;
procedure InitialValues;
(* initial motion control parameters for the Galil 610 board *)
(* currently not used *)
var MotorResp : string;
begin
        MotorResp := SendCommand('GN20');
        MotorResp := SendCommand('ZR227');
        MotorResp := SendCommand('KI1');
        MotorResp := SendCommand('FA127');
        MotorResp := SendCommand('TM1024');
        MotorResp := SendCommand('AC600000');
end;
procedure EnableMovement;
(* enables the motor *)
var MotorResp : string;
begin
        MotorResp := SendCommand('SH');
        Delay(100);
        MotorResp := SendCommand('SB0');
end;
procedure DisableMovement;
(* disables the motor *)
var MotorResp : string;
begin
        MotorResp := SendCommand('CB0');
        Delay(200);
        MotorResp := SendCommand('MO');
end;
procedure DeadSpaceN(var vd : double);
(* measures the dead space in the circuit *)
var p1,p2,v2,voltage,patm,
    pt, temp                            : double;
    sum, ave, loopsum                   : double;
    i, n, l, code                       : integer;
    steps                               : longint;
    result, command, s                  : string;
    volt_read,
    volt_sort                           : array[1..5] of double;
begin
    patm := 875;                        (* atm in cmH2O *)
    pt := -50.0;                        (* cmH20 *)
    writeln('Dead Space Calculation');
    writeln ('Please Connect Ventilator');
    writeln(' ');
    writeln('Press any key to continue');
    sound(3000);
    delay(200);
    nosound;
    repeat until keypressed;
    delay(500);
    loopsum := 0.0;
    SendCommand('DP0');
    for 1 := 1 to 5 do
    begin
    sum := 0.0;
    for i := 1 to 10 do
        begin
            AI_VRead(2,0,1,voltage);
            sum := sum + voltage;
        end;
    ave := sum/i;
    p1 := ave * 11.71265;
    str(p1:5:3,s);
    writeln('p1         :',s);
    p1 := p1 + patm;
    SendCommand('JG-4000');
    SendCommand('BGX');
    for i := 1 to 5 do volt_read[i] := 0;
    repeat
        AI_VRead(2,0,1,voltage);
        for i := 1 to 4 do volt_read[i] := volt_read[i+1];
        volt_read[5] := voltage;
        for i := 1 to 5 do volt_sort[i] := volt_read[i];
        for i := 1 to 4 do
            begin
                for n := i to 5 do
                    begin
```

```
                            if volt_sort[n] < volt_sort[i] then
                                begin
                                    temp          := volt_sort[i];
                                    volt_sort[i]  := volt_sort[n];
                                    volt_sort[n]  := temp;
                                end;
                    end;
            end;
        p2 := volt_sort[3] * 11.71265;
    until p2 < pt;
    SendCommand('STX');
    sum := 0.0;
    for i := 1 to 10 do
        begin
            AI_VRead(2,0,1,voltage);
            sum := sum + voltage;
        end;
    ave := sum/i;
    p2 := ave * 11.71265;
    str(p2:5:3,s);
    writeln('p2            : ',s);
    p2 := p2 + patm;
    FlushReadBuffer;
    result := SendCommand('TPX');
    val (result,steps,code);
    v2 := -steps/20202;
    str(v2:5:3,s);
    writeln('v2            : ',s);
    vd := v2*p2/(p1-p2),
    str(vd:5:3,s);
    writeln('dead space :    ',s);
    SendCommand('STX');
    delay(200);
    SendCommand('PA0');
    delay(200);
    SendCommand('BGX');
    delay(200);
    SendCommand('AMX');
    delay(200);
    SendCommand('STX');
    loopsum := loopsum + vd;
    end;
    vd := loopsum/l;
end;
procedure ParamMenu2(var r,r1,r2,c1,c2,f,tf,tp,td,tr : double; var df : string;
var tflg,ex : boolean);
(* lung parameter menu *)
var ch,
    tch : char;
    x,
    y,
    t,
    i   : integer;
    s   : string;
begin
    ex:= false;
    x := 14;
    y := 1;
    textbackground(black);
    repeat
        clrscr;
        if tflg = true then t := 4 else t := 0;
        textcolor(15);
        gotoxy(x,y);
        write('         Servo Lung Simulator');
        textcolor(12);
        gotoxy(x,y+2);
        write('      LDS Hospital Pulmonary Lab');
        gotoxy(x,y+3);
        write('         Salt Lake City, Utah');
        textcolor(11);
        gotoxy(x,y+5);
        write('0)');
        gotoxy(x,y+6);
        write('1)');
        gotoxy(x,y+7);
        write('2)');
        gotoxy(x,y+8);
        write('3)');
        gotoxy(x,y+9);
```

```
write('4)');
gotoxy(x,y+10);
write('5)');
gotoxy(x,y+11);
write('6)');
gotoxy(x,y+12+t);
write('7)');
gotoxy(x,y+13+t);
write('8)');
gotoxy(x,y+14+t);
write('9)');
textcolor(3);
gotoxy(x+4,y+5);
write('Resistance of Trachea          : ',round(r),' cmH2O/1/s');
gotoxy(x+4,y+6);
write('Resistance of Chamber One      : ',round(r1),' cmH2O/1/s');
gotoxy(x+4,y+7);
write('Resistance of Chamber Two      : ',round(r2),' cmH2O/1/s');
gotoxy(x+4,y+8);
write('Compliance of Chamber One      : ',round(c1*1000),' ml/cmH2O');
gotoxy(x+4,y+9);
write('Compliance of Chamber Two      : ',round(c2*1000),' ml/cmH2O');
gotoxy(x+4,y+10);
write('Functional Residual Capacity   : ',round(f*1000),' ml');
gotoxy(x+4,y+11);
write('Triggering                     : ');
if tflg = false then
    begin
        write( 'Off');
    end
else
    begin
        write('On');
        gotoxy(x+10,y+12);
        write('Trigger Flow            : ',round(tf*1000),' ml/s');
        gotoxy(x+10,y+13);
        str(tp:3:1,s);
        write('Trigger Pressure        : ',s,' cmH2O below PEEP');
        gotoxy(x+10,y+14);
        write('Trigger Duration        : ',round(td),' ms');
        gotoxy(x+10,y+15);
        write('Trigger Rate            : ',round(tr),' breaths/min');
    end;
gotoxy(x+4,y+12+t);
write('Save data to file              : ', df);
gotoxy(x+4,y+13+t);
write('Run Simulation');
gotoxy(x+4,y+14+t);
write('Exit Program');
textcolor(11);
gotoxy(x,y+16+t);
write('Enter your selection ');
ch := readkey;
textcolor(14);
gotoxy(x,y+16+t);
case ch of
'0' : begin
        write('Enter Trachea Resistance (cmH2O/l/s)      ');
        readln(r);
        if r < 1 then r := 1;
        if r > 100 then r := 100;
    end;
'1' : begin
        write('Enter Chamber One Resistance (cmH2O/1/s)   ');
        readln(r1);
        if r1 < 1 then r1 := 1;
        if r1 > 100 then r1 := 100;
    end;
'2' : begin
        write('Enter Chamber Two Resistance (cmH20/l/s)   ');
        readln(r2);
        if r2 < 1 then r2 := 1;
        if r2 > 100 then r2 := 100;
    end;
'3' : begin
        write('Enter Chamber One Compliance (ml/cmH20)    ');
        readln(c1);
        if c1 < 1 then c1 := 1;
        if c1 > 50 then c1 := 50;
        c1 := c1/1000;
```

```
                end;
        '4' : begin
                write('Enter Chamber Two Compliance (ml/cmH20)     ');
                readln(c2);
                if c2 < 1 then c2 := 1;
                if c2 > 50 then c2 := 50;
                c2 := c2/1000;
            end;
        '5' : begin
                write('Enter FRC (ml)          ');
                readln(f);
                if f < 0 then f := 0;
                if f > 1200 then f := 1200;
                f := f/1000;
            end;
        '6' : begin
                textcolor(14);
                write('    Enter Triggering Mode     ');
                gotoxy(x,y+17+t);
                write('Y)');
                gotoxy(x,y+18+t);
                write('N)');
                textcolor(3);
                gotoxy(x+3,y+17+t);
                write('Triggering');
                gotoxy(x+3,y+18+t);
                write('No Triggering');
                tch := readkey;
                textcolor(11);
                gotoxy(x,y+17+t);
                writeln('                    ');
                writeln('                    ');
                case tch of
                'y', 'Y' : begin
                            tflg:= true;
                            gotoxy(x+3,y+16+t);
                            write('Enter Trigger Flow Rate (ml/s)     ');
                            readln(tf);
                            tf:= tf/1000;
                            gotoxy(x+3,y+17+t);
                            write('Enter Trigger Pressure below PEEP (cmH2O)     ');
                            readln(tp);
                            gotoxy(x+3,y+18+t);
                            write('Enter Trigger Duration (ms)     ');
                            readln(td);
                            gotoxy(x+3,y+19+t);
                            write('Enter Trigger Rate (breath/min)     ');
                            readln(tr);
                        end;
                'n', 'N' : tflg:= false;
                else
                        begin
                            gotoxy(x+3,y+21+t);
                            write('You are an IGMO!   ');
                            sound(1000);
                            delay(1000);
                            nosound;
                        end;
                end;
            end;
        '7' : begin
                write('Enter Data File Name. <CR> = No File ');
                readln(df);
                if df = ' ' then df := 'None';
            end;
        '8' : begin
                gotoxy(x+40,24);
                write('Running Simulation!!!     ');
            end;
        '9' : begin
                ex := true;
            end;
        else
            begin
            gotoxy(x,y+20+t);
            write('You are an IGMO!        ');
            sound(1000);
            delay(1000);
            nosound;
            end;
```

```
            end;
        until (ch = '8') or (ch = '9');
        gotoxy(x,y+16+t);
        write ('                ');
end;
procedure FlushRReadBuffer;
(* clears data from the read buffer on the motion control board *)
var junk : byte;
begin
    while ((port[1001] and 32) = 0) do begin
        junk := port[1000];
    end;
end;
end;
program G1010;
(* Servo Lund Simulator
        Pulmonary Lab
        LDS Hospital
        Salt Lake City Utah *)
(* This program has the following features:
        USES the Galil 1010 board
        Double-Chamber volume transfer function
        Differention volume flow
        External triggering established by counter 1
        Five sample pressure filtering
        Flow adjustment is set at 3
        Write data to files
        Simple Triggering using Boyle's law: p1*v1 = p2*v2.
*)
uses crt, nidaq, errpr, 11010;
var
    n, i,
    Trig_cnt,
    startTrig,
    extConv,
    board,
    chan,
    gain,
    ctr,
    readingAvailable,
    reading,
    timebase,
    status           : integer;
    resolution,      (* steps per liter *)
    savecount,
    breathcnt,
    count,
    steps            : longint;
    R,
    R1,
    R2,
    C1,
    C2,
    delta,
    sum,
    temp,
    freq,
    duty,
    flow_cur,
    flow_adj,
    flowp_cur,
    flowp_prev,
    pres_cur,
    pres_prev,
    pres_peak,
    PEEP,
    pres_atm,
    vol_trig,
    vol_dead,
    vol_cur,
    vol1_cur,
    vol2_cur,
    vol_prev
    vol1_prev,
    vol2_rev,
    vol_dif,
    volp_cur,
    volp_prev,
    volp_max,
    volp_min,
```

```
        volp_mino,
        volp_maxo,
        vol_e,
        frc,
        rpm,
        denomv,
        Trig_Flow,
        Trig_Pres,
        Trig_Level,
        Trig_Dur,
        voltage,
        Trig_Val,
        Trig_Rate        :   double;
        newbreath,
        savedata,
        exit,
        Triggering,
        Trig_flag        :   boolean;
        volt_read,
        volt_sort        :   array[1. .9] of double;
        code,
        period1,
        period2          :   word;
        Start,
        Stop             :   real;
        AC,
        GN,
        FLOW,
        command,
        ptn,
        result,
        datfile          :   string;
        ch,
        key              :   char;
        F          ; text;
        label 1,2;
begin
        (* set default parameters for test lung *)
        frc              := 300/1000;
        freq             := 400;
        R                := 50;
        R1               := 50;
        R2               := 50;
        C1               := 10/1000;
        C2               := 10/1000;
        datfile          := 'dat';
        (* set NI DAQ board constants *)
        ctr              := 1;
        board            := 2;
        chan             := 0;
        gain             := 1;
        duty             := 0.5;
        startTrig        := 0;
        extConv          := 1;
        Trig_Flag        := false;
        Triggering       := false;
        (* set default triggering parameters *)
        Trig_Rate        := 5;        (* br/min *)
        Trig_Level       := -10;      (* cmH2O *)
        vol_dead         := 2.0;      (* liter *)
        pres_atm         := 875;      (* cmH2O *)
        (* conversion constant relating encoder counts to piston volume *)
        resolution:= 20202;           (* steps per liter *)
        clrscr;
        (* dead space measurements, ventilator end of circuit to be ocluded *)
        writeln('Do you wish to do DEAD SPACE testing? ');
        repeat
            key := readkey;
        until (key = 'y') or (key = 'Y') or (key = 'n') or (key = 'N');
        if (key = 'y') or (key = 'Y') then
          begin
            EnableMovement;
            StartPosition(resolution, frc);
            SendCommand('DP0');
            DeadSpaceN(vol_dead);
            DisableMovement;
            key := readkey;
            writeln('The dead space is: ',round(vol_dead*1000), 'ml');
            repeat until keypressed;
            key := readkey;
```

-continued

```
                end;
1:
    (* set initial conditions for control loop variables *)
    Trig_cnt        := 0;
    savecount       := 0;
    count           := 0;
    vol_prev        := 0;
    vol1_prev       := 0;
    vo12_prev       := 0;
    volp_cur        := 0;
    pres_peak       := 0;
    PEEP            := 150;
    volp_max        := 0;
    volp_min        := 3;
    volp_maxo       := 0;
    volp_mino       := 0;
    flowp_prev      := 0;
    breathcnt       := 0;
    newbreath       := false,
    ch              := 's';
    (* call to lung set-up menu *)
ParamMenu2 (R,R1,R2,C1,C2,frc,Trig_Flow,Trig_Pres,Trig_Dur,Trig_Rate,datfile,Trig_F
lag,exit);
    if exit = true then goto 2;
    delta           := 1/freq,
    (* calculate the volume denominator for the math model *)
    denomv:= R*C1*delta + delta*delta + C2*R2*delta + C2*R*delta;
    denomv:= denomv + R2*C1*C2*R1 + R1*C1*delta + R1*C1*C2*R + R2*C1*C2*R;
    (* open data file for storing lung simulator results *)
    Assign(F,datfile);
    Rewrite(F);
    (* initialize pressure transducer array to zero *)
    for i := 1 to 9 do volt_read[i] := 0.0;
    (* configure NI DAQ board for sample timeing and data collection *)
    status := AI_Clear(board);
    status := AI_Setup(board, chan, gain);
    status := DAQ_Config(board, startTrig, extConv);
    status := CTR_Rate(freq, duty, timebase, period1, period2);
    status := CTR_Square(board, ctr, timebase, period1, period2);
    EnableMovement;
    StartPosition(resolution, frc);
    (* initialize motion controller parameters *)
    result := sendcommand('KI0');
    result := sendcommand('KP1');
    result := sendcommand('KD19');
    result := sendcommand('FA2');
    result := sendcommand('AC2000000');
    result := sendcommand('GN19');
    result := sendcommand('ZR0.9486');
    result := sendcommand('JG0');
    result := sendcommand('DP0'),
    result := sendcommand('BGX');
    (* write data file column titles *)
    writeln (F,'sample,pressure,vol_calulated,vol_piston,flow_piston');
    (* alternate file titles *)
    (* writeln(F,'sample,pressure,flow,flowadj,volc,vola,vole');*)
    Sound(3000);
    Delay(300);
    NoSound;
    textcolor(10);
    gotoxy(14,19);
    write('Breath calculations');
    textcolor(3);
    gotoxy(14,20);
    write('Peak Pressure:        cmH2O');
    gotoxy(14,21);
    write('  PEEP:               cmH2O');
    gotoxy(14,22);
    write('  Insp. VT:           ml');
    gotoxy(14,23);
    write('  Exp. VT:            ml');
    gotoxy(14,24);
    write(" Breath rate:         b/min');
    textcolor(10);
(* get the start time for verifying control loop rate *)
    Start := Tizne;
    repeat
      begin
        (* wait until pressure sample is ready, based on timing signal *)
        repeat
```

```
      begin
        status := AI_Check(board, readingAvailable, reading);
      end;
    until readingAvailable = 1;
    status := AI_VScale(board, chan, gain, 1, 0, reading, voltage);
    (* five sample filter for pressure signal, find median value *)
    for i := 1 to 8 do volt_read[i] := volt_read[i+1];
    volt_read[9] := voltage;
    for i := 1 to 9 do volt_sort[i] := volt_read[i];
    for i := 1 to 8 do
      begin
          for n := 1 to 9 do
          begin
            if volt_sort[n] < volt_sort[i] then
              begin
                temp            := volt_sort[i];
                volt_sort[i]    := volt_sort[n];
                volt_sort[n]    := temp;
              end;
          end;
      end;
    pres_cur := volt_sort[5] * 10.6;
    (* pressure limit, exit control loop *)
    if pres_cur < -100 then goto 2;
    if pres_cur > 150 then goto 2;
    (* volume calculations based on math model *)
    vol1_cur := R*delta*vol1_prev + R2*C2*R1*vol1_prev + R1*delta*vol1_prev +
R1*C2*R*vol1_prev;
    vol1_cur := vol1_cur + R2*C2*R*vol1_prev + R*vol2_prev*delta +
C2*R2*delta*pres_cur + pres_cur*delta*delta;
    vol1_cur := vol1_cur*C1/denomv;
    vol2_cur := R*delta*vol1_prev + R1*C1*pres_cur*delta + pres_cur*delta*delta
+ R*vol2_prev*delta + R2*vol2_prev*delta;
    vol2_cur := vol2_cur + R1*C1*R*vol2_prev + R2*C1*R*vol2_prev +
R2*C1*R1*vol2_prev;
    vol2_cur := vol2_cur*C2/denomv;
    vol_cur := vol1_cur + vol2_cur;
    (* volume limit, exit control loop *)
    if vol_cur < -frc-0.05 then goto 2;
    if vol_cur > 1.8-frc then goto 2;
    (* calculate current flow *)
    vol_dif := vol_cur - vol_prev;
    flow_cur:= vol_dif/delta;
    vol_prev   := vol_cur;
    vol1_prev := vol1_cur;
    vol2_prev := vol2_cur;
    volp_prev := volp_cur;
    (* interrogate encoder for piston position *)
    result := sendcommand('TPX');
    val (result,steps,code);
    volp_cur        := steps/resolution;
    (* calculate error between math model volume and piston volume *)
    vol_e           := vol_cur - volp_cur;
    (* determine actual air flow in test lung *)
    flowp_cur       := (volp_cur - volp_prev)*freq;
    flow_adj        := flow_cur + vol_e * 2;
    str(round(flow_adj * -resolution), FLOW);
    rpm := flow_adj * resolution * 0.015;
    (* breath data calculations *)
    if ((flowp_prev < 0) and (flowp_cur >= 0)) then newbreath := true;
    if (newbreath and (breathcnt < 200)) then new breath := false;
    if (newbreath and ((pres_cur - pres_prev) < 0.1 )) then newbreath := false;
    if triggering then newbreath := false;
    if newbreath = true then
      begin
          sound(2000);
          delay(10);
          nosound;
          gotoxy(34,20);
          write(round(pres_peak),' ');
          gotoxy(34,21);
          write(round(PEEP),' ');
          gotoxy(34,22);
          write(round((volp_max - volp_mino)*1000),' ');
          gotoxy(34,23);
          write(round((volp_max - volp_min)*1000),' ');
          gotoxy(34,24);
          write(round(freq * 60 / breathcnt),' ');
          pres_peak        := 0;
          PEEP             := 150;
```

```
                volp_maxo       := volp_max;
                volp_mino       := volp_min;
                volp_max        := 0;
                volp_min        := 3;
                breathcnt       := 0;
                newbreath       := false;
            end;
        inc (breathcnt);
        if pres_cur > pres_peak then pres_peak := pres_cur;
        if(not triggering) and (pres_cur < PEEP) then PEEP := pres_cur;
(*      if pres_cur < PEEP then PEEP := pres_cur; *)
        if volp_cur > volp_max then volp_max := volp_cur;
        if volp_cur < volp_min then volp_min := volp_cur;
        flowp_prev              := flowp_cur;
        pres_prev               := pres_cur;
        (* Triggering function *)
        if Trig_flag = true then
            begin
                if (count mod round(60*freq/Trig_Rate)) = 0 then
                begin
                    Triggering      := True;
                    Trig_cnt        := 0;
                    vol_trig        := ((volp_cur+vol_dead+frc) * (pres_cur+pres_atm) /
(pres_atm-abs(Trig_Pres))) - vol_dead - frc;
                end;
            end;
        if Triggering then
            begin
                if (Trig_cnt*delta*1000 > Trig_Dur) then Triggering := false;
            end;
        if Triggering then
            begin
                if (volp_cur > vol_trig) then
                    begin
                        FLOW := '0';
                    end
                else
                    begin
                        str(round(Trig_Flow * -resolution), FLOW);
                    end;
                inc (Trig_cnt);
            end;
        (* send jog command to motion control board *)
        command := 'JG' + FLOW;
        result := SendCommand(command);
        if keypressed then ch := readkey;
        (* initiates 10 seconds of data collection when 'F1' is pressed *)
        if (datfile <>'None') and (ord(ch) = 59) and (savecount = 0) then
            begin
                savedata := true;
                savecount:= round(freq) * 10;
                ch := 's';
            end;
        if savecount = 0 then savedata := false;
        if savedata then
            begin
                            if (savecount mod 4 = 0) then
writeln(F,count,',',pres_cur,',',vol_cur,',',volp_cur,',',flowp_cur);
                (* alternate data file values *)
                (*
writeln(F,count,',',pres_cur,',',flow_cur,',',flow_adj,',',vol_cur,',',volp_cur,',
',vol_e); *)
                dec(savecount);
            end;
        inc(count);
        end;
    (* remain in control loop until space bar is pressed *)
    until ord(ch) = 32;
2:
    (* stop motor motion and reset motion control board *)
    SendCommand('STX');
    SendCommand('CB0');
    SendCommand('RS');
    (* get stop time to verify control loop frequency *)
    Stop := Time;
    (* stop NI DAQ board *)
    CTR_Stop(board, ctr);
    if exit = false then close(F);
    Sound(1000);
    Delay(100);
```

-continued

```
    NoSound;
    Delay(100);
    Sound(1000);
    Delay(150);
    NoSound;
    textcolor(15);
    gotoxy(1,24);
    write('                   ');
    gotoXY(47,24);
    (* calculate control loop frequency *)
    write('Freq = ',round(count/(Stop-Start)),' Hz    Again? (y/n) ');
    key := readkey;
    if (key <>'n') and (key <>'N') then goto 1;
end.
```

What is claimed is:

1. A lung simulator comprising:

a. a chamber having at least one outlet, said outlet functioning as a lung outlet;

b. a pressure generating mechanism for generating positive and negative pressures within said chamber;

c. a controller, further comprising a servo control having a frequency response greater than 200 Hz, for controlling said pressure generating mechanism to generate a desired pressure waveform thereby causing said pressure generating mechanism to simulate a multi-compartment human lung;

d. a pressure transducer positioned within said chamber for measuring the air pressure within said chamber;

e. an air flow determining means for determining the flow of air from said chamber;

f. a digital computer system controlled by a software program, wherein said software program further comprises a model of lung behavior, a chest wall model, and a user interface wherein a user may control said lung simulator and wherein said software program is user programmable to provide user control of said model of lung behavior; and g. a data storage device connected to said digital computer system; wherein said chamber has a volume which corresponds to the volume of a human lung; wherein said controller communicates with said digital computer system and can be controlled by said software program; wherein said model of lung behavior takes as inputs said air pressure within said chamber and said flow of air from said chamber; wherein said desired pressure waveform is determined from said computation model of lung behavior; and wherein said pressure generating mechanism is controlled by said controller such that the pressure within said chamber equals said desired pressure waveform.

2. A lung simulator in accordance with claim 1, wherein said software program comprises:

a. a data acquisition module which controls the acquisition of signal data from said pressure transducer and said air flow determining means;

b. a model reference control module which performs calculations based on said computational model of lung behavior;

c. a controller driver which calculates and sends control signals to said controller;

d. a user interface which allows a user to input parameters used in said computational model of lung behavior, to monitor system functions, and to view pressure and flow data;

e. a data storage module which saves information to and receives information from said storage device; and f. a system control module which controls and coordinates all functions of the lung simulator.

3. A lung simulator in accordance with claim 1, wherein said computational model of lung behavior comprises a single-chamber lung model wherein the behavior of the lung is represented by a single resistance in series with a single compliance driven by a pressure representing the activity of the chest wall and diaphragm.

4. A lung simulator in accordance with claim 3, wherein said pressure varies periodically with a period which equals the period of one breathing cycle, wherein said pressure has a constant negative value for a first time interval, wherein said pressure is zero for a second time interval, wherein said first time interval plus said second time interval equal the duration of one breathing cycle, and wherein said first time interval is less than the duration of the inspiratory portion of a breathing cycle.

5. A lung simulator in accordance with claim 3, wherein said pressure varies periodically with a period which equals the period of one breathing cycle, wherein said pressure decreases exponentially from zero to a predetermined negative value for the duration of the inspiratory portion of said breathing cycle, and wherein said pressure is zero for the duration of the expiratory portion of said breathing cycle.

6. A lung simulator in accordance with claim 3, wherein said pressure comprises a user-defined waveform.

7. A lung simulator in accordance with claim 3, wherein said pressure comprises a pressure waveform recorded from a human patient.

8. A lung simulator in accordance with claim 1, wherein said computational model of lung behavior comprises a two-chamber lung model wherein the behavior of the lung is represented by a first resistance in series with a second resistance and first compliance which are in parallel with a third resistance and second compliance, all of which are driven by a pressure representing the activity of the chest wall and diaphragm.

9. A lung simulator in accordance with claim 8, wherein said pressure varies periodically with a period which equals the period of one breathing cycle, wherein said pressure has a constant negative value for a first time interval, wherein said pressure is zero for a second time interval, wherein said first time interval plus said second time interval equal the duration of one breathing cycle, and wherein said first time interval is less than the duration of the inspiratory portion of a breathing cycle.

10. A lung simulator in accordance with claim 8, wherein said pressure varies periodically with a period which equals the period of one breathing cycle, wherein said pressure decreases exponentially from zero to a predetermined negative value for the duration of the inspiratory portion of said breathing cycle, and wherein said pressure is zero for the duration of the expiratory portion of said breathing cycle.

11. A lung simulator in accordance with claim 8, wherein said pressure is a user-defined waveform.

12. A lung simulator in accordance with claim 8, wherein said pressure comprises a pressure waveform recorded from a human patient.

13. A lung simulator comprising:
   a. a chamber having at least one outlet, said outlet functioning as a lung outlet;
   b. a pressure generating mechanism for generating positive and negative pressures within said chamber;
   c. a controller for controlling said pressure generating mechanism to generate a desired pressure waveform, wherein said controller further comprises a servo controller having a frequency response greater than 200 Hz;
   d. a pressure transducer positioned within said chamber for measuring the air pressure within said chamber;
   e. a flow measuring device positioned at the outlet of said chamber for measuring the flow of air from said chamber;
   f. a digital computer system controlled by a software program creating a simulation of a multi-compartment human lung; and
   g. a data storage device connected to said digital computer system.

14. A lung simulator comprising:
   a. a cylinder of a known diameter having an outer wall and an outlet at a first end;
   b. a piston located within said cylinder and forming one end of an inner gaseous chamber within said cylinder, the other end of said inner gaseous chamber being formed by said first end of said cylinder;
   c. a pressure transducer positioned at said outlet of said cylinder;
   d. a position sensing device located within said cylinder whereby the position of said piston with respect to said first end of said cylinder is determined;
   e. a motor for causing movement of said piston within said cylinder;
   f. a digital computer system controlled by a software program;
   g. a data storage device connected to said digital computer system; and
   h. a motor controller for controlling said motor and thereby movement of said piston
   wherein said controller communicates with said digital computer system and can be controlled by said software program, said controller further comprises a servo control having a frequency response greater than 200 Hz and which when controlled by said software program causes said piston to simulate a multi-compartment human lung;
   wherein the volume of said inner gaseous chamber is a function of said piston position and said known cylinder diameter; wherein said software program includes a computational model of lung behavior; a computational model of chest wall functions; and is user programmable to adjust said computational model to a plurality of conditions; wherein said software program calculates the actual volume of said inner gaseous chamber from said piston position and from said known cylinder diameter; and wherein the movement of said piston within said cylinder is controlled by said controller such that the actual volume of said inner gaseous chamber equals said desired long volume.

15. A lung simulator in accordance with claim 14, wherein said computational model of lung behavior comprises a single-chamber lung model wherein the behavior of the lung is represented by a single resistance in series with a single compliance driven by a pressure representing the activity of the chest wall and diaphragm.

16. A lung simulator in accordance with claim 15, wherein said pressure varies periodically with a period which equals the period of one breathing cycle, wherein said pressure has a constant negative value for a first time interval, wherein said pressure is zero for a second time interval, wherein said first time interval plus said second time interval equal the duration of one breathing cycle, and wherein said first time interval is less than the duration of the inspiratory portion of a breathing cycle.

17. A lung simulator in accordance with claim 15, wherein said pressure varies periodically with a period which equals the period of one breathing cycle, wherein said pressure decreases exponentially from zero to a predetermined negative value for the duration of the inspiratory portion of said breathing cycle, and wherein said pressure is zero for the duration of the expiratory portion of said breathing cycle.

18. A lung simulator in accordance with claim 15, wherein said pressure comprises a user-defined waveform.

19. A lung simulator in accordance with claim 15, wherein said pressure comprises a pressure waveform recorded from a human patient.

20. A lung simulator in accordance with claim 15, wherein said computational model of lung behavior comprises a two-chamber lung model wherein the behavior of the lung is represented by a first resistance in series with a second resistance and first compliance which are in parallel with a third resistance and second compliance, all of which are driven by a pressure representing the activity of the chest wall and diaphragm.

21. A lung simulator in accordance with claim 20, wherein said pressure varies periodically with a period which equals the period of one breathing cycle, wherein said pressure has a constant negative value for a first time interval, wherein said pressure is zero for a second time interval, wherein said first time interval plus said second time interval equal the duration of one breathing cycle, and wherein said first time interval is less than the duration of the inspiratory portion of a breathing cycle.

22. A lung simulator in accordance with claim 20, wherein said pressure varies periodically with a period which equals the period of one breathing cycle, wherein said pressure decreases exponentially from zero to a predetermined negative value for the duration of the inspiratory portion of said breathing cycle, and wherein said pressure is zero for the duration of the expiratory portion of said breathing cycle.

23. A lung simulator in accordance with claim 20, wherein said pressure is a user-defined waveform.

24. A lung simulator in accordance with claim 20, wherein said pressure comprises a pressure waveform recorded from a human patient.

25. A lung simulator in accordance with claim 14, wherein said software program comprises:
   a. a data acquisition module which controls the acquisition of signal data from said pressure transducer and said position sensing device;
   b. a model reference control module which performs calculations based on said computational model of lung behavior;

c. a motor controller driver which calculates and sends control signals to said motor controller;

d. a user interface which allows a user to input parameters used in said computational model of lung behavior, to monitor system functions, and to view pressure and volume data;

e. a data storage module which saves information to and receives information from said storage device; and f. a system control module which controls and coordinates all functions of the lung simulator.

26. A method of controlling a servo lung simulator in accordance with a computational lung model, said servo lung simulator comprising a gaseous chamber and a pressure generating mechanism for generating positive and negative pressures within said chamber, said method comprising the steps of:

a. selecting parameters to be used in said lung model;

b. measuring the air pressure in said gaseous chamber;

c. determining the flow of air from said gaseous chamber;

d. calculating the desired pressure within said gaseous chamber according to said lung model;

e. controlling, using a servo controller having a frequency response greater than 200 Hz, said pressure generating mechanism such that the volume of said inner gaseous chamber approximates said desired current volume; and f. programming said lung model to adapt said lung model performance to one or more conditions and to simulate a multi-compartment human lung.

27. A method of controlling a servo lung simulator in accordance with a single chamber lung model, said servo lung simulator having an inner gaseous chamber having a single outlet and being formed by a piston within a cylinder, said method comprising the steps of:

a. selecting a first parameter for lung resistance value to be used in the lung model;

b. selecting a second parameter for lung compliance value to be used in said lung model;

c. selecting a third parameter for a pressure waveform to be used in said lung model;

d. measuring the air pressure in the inner gaseous chamber;

e. determining the current volume of said inner gaseous chamber;

f. calculating the desired current volume of said inner gaseous chamber according to said lung model;

g. controlling the movement of the piston within the cylinder such that the volume of said gaseous chamber approximates said desired current volume, wherein said controlling provides a servo control having a frequency response greater than 200 Hz; and h. modifying one or more of said selected parameters to provide operational control of said lung model during the operation of said lung simulator;

wherein said lung model consists of said lung resistance in series with said lung compliance driving by said pressure waveform which represents the activity of the chest wall and diaphragm, thereby providing a simulation of a multi-compartment human lung.

28. A method in accordance with claim 27 wherein said pressure waveform is a user-defined waveform.

29. A method in accordance with claim 27 wherein said pressure waveform comprises a pressure waveform measured from the lungs of a human patient.

30. A method of controlling a servo lung simulator in accordance with a two chamber computational lung model, said servo lung simulator having an inner gaseous chamber having a single outlet and being formed by a piston within a cylinder, said method comprising the steps of:

a. selecting first, second, and third lung resistance values to be used in the lung model, wherein said selecting of resistance values is made while said servo lung simulator is functioning to respond to desired changes in said servo lung simulator behavior;

b. selecting first and second lung compliance values to be used in said lung model, wherein said selecting of compliance values is made while said servo lung simulator is functioning to respond to desired changes in said servo lung simulator behavior;

c. selecting a pressure waveform to be used in said lung model;

d. measuring the air pressure in the gaseous chamber;

e. determining the current volume of the gaseous chamber;

f. calculating the desired current volume of said gaseous chamber according to said lung model; and g. controlling the movement of the piston within the cylinder such that the volume of said gaseous chamber approximates said desired current volume and wherein controlling further comprising servo controlling said piston with a frequency response greater than 200 Hz;

wherein said lung model consists of said first resistance in series with said second resistance and said first compliance which are in parallel with said third resistance and said second compliance, all of which are driven by said pressure waveform, which represents the activity of the chest wall and diaphragm and which provides a simulation of a multi-compartment human lung.

31. A method in accordance with claim 30 wherein said pressure waveform is a user-defined waveform.

32. A method in accordance with claim 30 wherein said pressure waveform comprises a pressure waveform measured from the lungs of a human patient.

* * * * *